(12) United States Patent
Han et al.

(10) Patent No.: US 10,205,575 B2
(45) Date of Patent: Feb. 12, 2019

(54) METHODS FOR SENDING AND RECEIVING ACK/NACK INFORMATION, BASE STATION, AND TERMINAL

(71) Applicant: ZTE Corporation, Shenzhen (CN)

(72) Inventors: Xiaogang Han, Shenzhen (CN); Bo Dai, Shenzhen (CN); Shuqiang Xia, Shenzhen (CN); Wei Gou, Shenzhen (CN); Zhaohua Lu, Shenzhen (CN); Zhisong Zuo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 419 days.

(21) Appl. No.: 14/764,241

(22) PCT Filed: Dec. 20, 2013

(86) PCT No.: PCT/CN2013/090096
§ 371 (c)(1),
(2) Date: Nov. 17, 2015

(87) PCT Pub. No.: WO2014/117604
PCT Pub. Date: Aug. 7, 2014

(65) Prior Publication Data
US 2016/0094327 A1    Mar. 31, 2016

(30) Foreign Application Priority Data

Jan. 29, 2013  (CN) .......................... 2013 1 0034464

(51) Int. Cl.
*H04W 72/00* (2009.01)
*H04L 1/18* (2006.01)
(Continued)

(52) U.S. Cl.
CPC .......... *H04L 5/0055* (2013.01); *H04L 1/0073* (2013.01); *H04L 1/1861* (2013.01);
(Continued)

(58) Field of Classification Search
CPC . H04L 5/00; H04L 1/18; H04L 5/0055; H04L 1/0073; H04L 1/1861;
(Continued)

(56) References Cited

U.S. PATENT DOCUMENTS

| 8,705,477 B2* | 4/2014 | Baldemair | ............ H04L 1/0031 370/329 |
| 8,830,883 B2* | 9/2014 | Chen | ..................... H04L 1/1812 370/329 |

(Continued)

FOREIGN PATENT DOCUMENTS

| CN | 1701533 A | 11/2005 |
| CN | 101222304 A | 7/2008 |

(Continued)

OTHER PUBLICATIONS

International Search Report for corresponding application PCT/CN2013/090096 filed Dec. 20, 2013; dated Mar. 6, 2014.

*Primary Examiner* — Edan Orgad
*Assistant Examiner* — Vanneilian Lalchinthang
(74) *Attorney, Agent, or Firm* — Cantor Colburn LLP

(57) ABSTRACT

Provided are methods for sending and receiving ACK/NACK information, a base station, and a terminal, wherein the method for sending ACK/NACK information includes that ACK/NACK information of a plurality of terminals is divided into X groups according to a preset indication parameter, wherein X is a positive integer greater than or equal to 1; joint coding is performed on ACK/NACK information corresponding to each group in the X groups, so as to obtain X first bit blocks; and the X first bit blocks are mapped to a predetermined ACK/NACK physical resource and sent. By means of the disclosure, reliable transmission of HARQ-ACK information of a terminal on an NCT is implemented, the reliability of transmission of UL data in a Low Cost terminal is improved, and problems such as a (Continued)

conflict of PHICH resource allocation and ICIC of a frequency domain in a small cell are solved.

20 Claims, 6 Drawing Sheets

(51) Int. Cl.
    *G06F 11/00*     (2006.01)
    *H04L 5/00*     (2006.01)
    *H04L 1/00*     (2006.01)
    *H04W 72/04*     (2009.01)

(52) U.S. Cl.
    CPC .......... *H04L 5/0007* (2013.01); *H04W 72/042* (2013.01); *H04W 72/0413* (2013.01); *H04L 2001/0093* (2013.01)

(58) Field of Classification Search
    CPC ......... H04L 5/0007; H04L 2001/0093; H04W 72/04; H04W 88/00; H04W 72/042; H04W 72/0413; H04J 11/00; H04B 1/707
    USPC ........................................................ 370/329
    See application file for complete search history.

(56) References Cited

U.S. PATENT DOCUMENTS

| 8,880,084 | B2* | 11/2014 | Cho ..................... | H04L 1/1854 |
| | | | | 370/329 |
| 9,450,732 | B2* | 9/2016 | Damnjanovic ....... | H04L 1/0028 |
| 2008/0095040 | A1* | 4/2008 | Kwon ................... | H04L 1/1854 |
| | | | | 370/210 |
| 2009/0055703 | A1* | 2/2009 | Kim ........................ | H04J 11/00 |
| | | | | 714/748 |
| 2010/0098012 | A1* | 4/2010 | Bala ....................... | H04L 5/001 |
| | | | | 370/329 |
| 2010/0157927 | A1* | 6/2010 | Mochizuki ............ | H04L 1/1685 |
| | | | | 370/329 |
| 2012/0287828 | A1* | 11/2012 | Chen ..................... | H04L 1/1614 |
| | | | | 370/280 |
| 2013/0083742 | A1* | 4/2013 | Baldemair ............. | H04L 1/003 |
| | | | | 370/329 |

FOREIGN PATENT DOCUMENTS

| CN | 101646237 A | 2/2010 |
| CN | 101689980 A | 3/2010 |
| WO | 2010090950 A1 | 8/2010 |

* cited by examiner

METHODS FOR SENDING AND RECEIVING ACK/NACK INFORMATION, BASE STATION, AND TERMINAL

TECHNICAL FIELD

The disclosure relates to the field of communications, and including methods for sending and receiving Acknowledgement (ACK)/Negative Acknowledgement (NACK) information, a base station and a terminal.

BACKGROUND

In Long-Term Evolution (LTE) Release (Rel) 10, physical downlink channels mainly include: a Physical Downlink Shared Channel (PDSCH), a Physical Broadcast Channel (PBCH), a Physical Multicast Channel (PMCH), a Physical Control Format Indicator Channel (PCFICH), a Physical Downlink Control Channel (PDCCH), and a Physical Hybrid Automatic Repeat Request (HARQ) Indicator Channel (PHICH), wherein the PHICH mainly carries ACK/NACK information of an Uplink (UL) HARQ. A plurality of PHICH resources are mapped onto the same Resource Element (RE) to form a PHICH group, wherein PHICHs in the same group are distinguished by different orthogonal sequences. A PHICH resource is represent by a serial number group ($n_{PHICH}^{group}$, $n_{PHICH}^{seq}$), where $n_{PHICH}^{group}$ is a serial number of the PHICH group and $n_{PHICH}^{seq}$ is a serial number of an orthogonal sequence in the PHICH group.

A processing flow of the PHICH is: 1 ACK/NACK bit→repeating for 3 times→Binary Phase-Shift Keying (BPSK) modulation→spectrum spreading→layer mapping and pre-coding→physical resource mapping. The PHICH and the PDCCH are subjected to multiplexing in the same control resource, wherein Table 1 shows durations of the PHICH in a time domain.

TABLE 1

Table of durations of PHICH in time domain

| PHICH duration | Non-Multicast-Broadcast Single-Frequency Network (MBSFN) sub-frame | | MBSFN sub-frame |
|---|---|---|---|
| | Sub-frame 1 and sub-frame 6 of frame structure type 2 | All other conditions | Carrier supporting PDSCH and PMCH |
| Normal | 1 | 1 | 1 |
| Extended | 2 | 3 | 2 |

With the development of LTE-Advance carrier aggregation technology, a New Carrier Type (NCT) is proposed in LTE Rel-11, and detailed characteristics of such a carrier are still in discussion. At present, it is confirmed that Cell-specific Reference Signals (CRS) of the singal port of the LTE R8/R9/R10 having a period of 5 milliseconds are applied to perform synchronous tracking in the NCT, demodulation on data and control information in the NCT is based on a Demodulation Reference Symbol (DM-RS), and channel measurement is based on a Channel State Information-Reference Symbol (CSI-RS). Since a traditional Rel-8 PHICH is based on CRS demodulation, and sparse CRSs on the NCT are not used for demodulating data according to the progress of existing Rel-11 protocols, a traditional Rel-8 PHICH structure can be hardly transmitted on the NCT. In the meanwhile, a terminal can only monitor a corresponding PHICH signal on a Component Carrier (CC) to which the terminal sends an UL grant as stipulated by existing R10 protocols, thus an enhanced PHICH (ePHICH) is also required on an NCT used for transmitting an UL grant by using an enhanced PDCCH (ePDCCH). It is necessary to design a new ePHICH structure on the NCT in consideration of demodulation based on a DM-RS and the introduction of the ePDCCH and in order to implement Inter Cell Interference Coordination (ICIC) of a frequency domain.

In a research process of low cost Machine Type Communication (MTC) in Rel-11, since requirements on a transceiving bandwidth of a low cost terminal are lowered and a low cost User Equipment (UE) only need some bandwidths to access. A low cost UE fails to receive PHICHs completely when a system bandwidth is far larger than a transceiving bandwidth of the low cost UE. Besides, there are a large number of low cost UEs, and complicated technologies including Space Division Multiplexing (SDM) and so on are not applied on an UL, it is necessary to consider a new PHICH to ensure transmission of UL data on the low cost UEs at the moment.

In a research of small cells since Rel-12, the number of terminals does not present a great growth compared the number before and only rates of peak data of terminals have been improved, though there are numerous small cells. If HARQ-ACK information of a terminal needs to be transmitted via a macro cell, there may be a collision or a deficiency in capacity according to the original PHICH architecture. Therefore, a new PHICH architecture in the future needs to not only being able to avoid a collision of PHICH resources of different terminals under different small cells via scheduling, but also have a sufficient capacity.

Besides, in a research of cooperation between an authorized spectrum and an unauthorized spectrum, if carrier aggregation is applied, an authorized spectrum is used as a main carrier and an unauthorized spectrum is used as an auxiliary carrier, and the unauthorized spectrum may be scheduled by the main carrier via a certain mechanism. When the main carrier is an LTE system, since a reference signal used in the unauthorized spectrum carrier has not been determined finally, a traditional PHICH structure can be hardly transmitted in the unauthorized spectrum carrier and it is necessary to consider a new PHICH to ensure the reliability of transmission in the unauthorized spectrum carrier.

In conclusion, it is necessary to enhance the design of the PHICH to solve problems including, demodulation performed by using a DM-RS under the NCT, the reliability of UL data transmission of a low cost UE, a conflict of PHICH resource allocation under a small cell, Inter-Cell Interference Coordination (ICIC) of a frequency domain, and the reliability of transmission in an unauthorized spectrum carrier during cooperation of an authorized spectrum and an unauthorized spectrum, and so on.

SUMMARY

Methods for sending and receiving ACK/NACK information, a base station and a terminal are provided in the disclosure, so at least to solve the problems including a conflict of resource allocation during transmission of ACK/NACK information, and demodulation based on a DM-RS and so on in related art.

According to a first aspect of the embodiment, a method for sending Acknowledgement (ACK)/Negative Acknowledgement (NACK) information is provided, comprising: dividing ACK/NACK information of a plurality of terminals into X groups according to a preset indication parameter, wherein X is a positive integer greater than or equal to 1; performing joint coding on ACK/NACK information corresponding to each group of the X groups respectively, to obtain X first bit blocks; and mapping the X first bit blocks to a predetermined ACK/NACK physical resource and sending the X first bit blocks.

In an example embodiment, the preset indication parameter comprises at least one of the followings: a size of each of the X first bit blocks, the number X of the groups into which the ACK/NACK information of the plurality of terminals is to be divided, the number of bits of the ACK/NACK information corresponding to each group of the X groups, and location information corresponding to ACK/NACK information of each terminal of the plurality of terminals.

In an example embodiment, the predetermined ACK/NACK physical resource comprises at least one of the followings: the predetermined ACK/NACK physical resource comprises one or more Resource Blocks, RBs; the predetermined ACK/NACK physical resource and an enhanced Physical Downlink Control Channel (ePDCCH) jointly occupy one or more the RBs; the predetermined ACK/NACK physical resource and a Physical Downlink Shared Channel (PDSCH) jointly occupy one or more the RBs.

In an example embodiment, a time domain resource of the predetermined ACK/NACK physical resource comprises one or more of the following forms: an occupied time domain length is predefined to be a first time slot and/or a second time slot of a sub-frame; a preset Orthogonal Frequency Division Multiplexing (OFDM) symbol in a predefined sub-frame to be occupied; the serial number of the occupied sub-frame is predefined to be n+k, where n is a serial number of a sub-frame on which a network side receives a Physical Uplink Shared Channel (PUSCH) of a terminal and k is an integer smaller than or equal to 10; a preset part of sub-frames in a predefined wireless frame, wherein the sub-frames of the preset part form a set S and S appears repeatedly with a period of m; an initial OFDM symbol p in a predefined sub-frame, and a value range of p is [0,9].

In an example embodiment, a frequency domain resource of the predetermined ACK/NACK physical resource comprises one or more of the following forms: N Physical RB, PRB pairs at two sidebands of a frequency domain, N PRB pairs mapped at equal intervals, N discrete PRB pairs on a frequency band of which a bandwidth is 1.4M and a center is a center frequency point, N fixed and successive PRB pairs of the central frequency point, and N PRB pairs of the first PRB numbers, N PRB pairs indicated by a signalling, wherein N is a preset value, or a parameter for determining a value of N comprises at least one of the followings: a system bandwidth, a sub-frame type, a Cyclic Prefix (CP) type, a system mode, a distribution ratio of Uplink (UL) sub-frames to DownLink sub-frames of Time Division Duplex (TDD) and a configuration signalling.

In an example embodiment, performing the joint coding on the ACK/NACK information corresponding to each group of the X groups respectively comprises at least one of the followings: performing Tail Biting Convolutional Coding (TBCC); performing Reed-Muller (RM) coding; performing Dual RM coding.

In an example embodiment, after performing the RM coding or the Dual RM coding on the ACK/NACK information corresponding to each group of the X groups respectively, the method further comprises: performing the TBCC on the ACK/NACK information corresponding to each group of the X groups respectively, to obtain the X first bit blocks.

In an example embodiment, the number of bits occupied by the ACK/NACK information corresponding to each group of the X groups is one of the followings: a size of a Downlink Control Information (DCI) format 3; a size of a DCI format 1C; a size determined according to indication information, wherein the indication information comprises at least one of the followings: a carrier type, a system bandwidth, a service type, an indication signalling, a sub-frame type, a system mode, a distribution ratio of UL sub-frames to DL sub-frames.

In an example embodiment, performing the joint coding on the ACK/NACK information corresponding to each group of the X groups respectively further comprises: adding Cyclic Redundancy Check (CRC) of 8 bits or 16 bits to the ACK/NACK information, wherein the number of bits of the added CRC is a predefined value or a value notified by a signalling.

In an example embodiment, performing the joint coding on the ACK/NACK information corresponding to each group of the X groups respectively further comprises: performing at least one of the following processing on each first bit block of the X first bit blocks: rate matching, scrambling and interleaving.

In an example embodiment, the number of Resource Element (REs) contained in a physical resource corresponding to each first bit block of the X first bit blocks comprises at least one of the followings: a preset resource size in an ePDCCH which is a size corresponding to 1, 2, 4, 8 or 16 enhanced Control Channel Element (eCCEs); a size corresponding to ½, ¼, or ⅛ of an eCCE formed by available REs in a PRB of one ePDCCH; a size corresponding to m enhanced Resource Element Group (eREGs) wherein m is an integer larger than or equal to 1; a value of the number of the REs indicated by an upper layer signaling or configured directly.

In an example embodiment, mapping the X first bit blocks to the predetermined ACK/NACK physical resource and sending the X first bit blocks comprises: mapping the X first bit blocks to one predefined resource set in the predetermined ACK/NACK physical resource and sending the X first bit blocks, wherein a location of the one predefined resource set is fixed, and ACK/NACK information corresponding to different groups of the X groups corresponds to different locations in the resource set, or performing scrambling on the X first bit blocks according to a dedicated Radio Network Temporary Identifier (RNTI) used for receiving ACK/NACK information, selecting one resource set from a plurality of resource sets in the predetermined ACK/NACK physical resource to perform mapping and sending, wherein a rule for selecting the one resource set comprises: selecting the one resource set according to a preset resource size, or selecting the one resource set according to a resource size determined by at least one of the following parameters: a system bandwidth, a sub-frame type, a Cyclic Prefix (CP) type, and a distribution ratio of UL sub-frames to DL sub-frames.

In an example embodiment, when an eCCE is used as a mapping unit, all or some eCCEs in the whole RB are taken to perform mapping, or a plurality of successive or discrete eCCEs are taken to perform mapping, or eCCEs selected at an interval according to a preset rule are taken to perform mapping; when an eREG is taken as a unit to perform mapping, some eREG units in one eCCE are taken to perform mapping, or some eREG units in a plurality of eCCEs mapped successively or discretely are taken to perform mapping.

In an example embodiment, mapping the X first bit blocks to the predetermined ACK/NACK physical resource and sending the X first bit blocks further comprises: selecting, in the predetermined ACK/NACK physical resource, a transmission manner of the X first bit blocks, wherein when a distributed mapping manner is applied, a Demodulation Reference Symbol (DM-RS) port of an eREG in an discrete eCCE is the same as a port of an ePDCCH, or is a predefined DM-RS port, or is a DM-RS port notified by a signalling of an upper layer, or is a preset dedicated DM-RS port of the ACK/NACK information; when a centralized mapping manner is applied, an applied antenna port is the same as a port of an ePDCCH, or is a predefined DM-RS port, or is a DM-RS port notified by a signalling of an upper layer, or is a preset dedicated DM-RS port of the ACK/NACK information, or is a port determined according to a predefined parameter, wherein the predefined parameter comprises at least one of the followings: an index of a current eCCE, a cell identifier, a terminal identifier, and a group index corresponding to the first bit blocks, wherein the transmission manner of the X first bit blocks comprises a predefined manner or a manner notified via a signalling.

In an example embodiment, mapping the X first bit blocks to the predetermined ACK/NACK physical resource and sending the X first bit blocks further comprises: determining a group where ACK/NACK information of each terminal of the plurality of terminals locates, and a location of the ACK/NACK information of each terminal in the group, wherein a parameter for determining the group and the location in the group at least comprises one of the following parameters: the minimum or maximum PRB index $I_{PRB\_RA}$ of PRB of an UL resource allocated to each terminal, a DM-RS cyclic shift value $n_{DMRS}$ in a PUSCH allocated to each terminal, a size $N_{ePHICH}^{Total}$ of each first bit block of the X first bit blocks, an index value $k_p$ corresponding to a DM-RS port during performing mapping on the first bit blocks, an indication parameter $I_{PHICH}$, and the X value; or determining directly, through a signaling of an upper layer, a group where ACK/NACK information of each terminal of the plurality of terminals locates, and the location of the ACK/NACK information of each terminal in the group.

In an example embodiment, the method further comprises: sending parameter information of the predetermined ACK/NACK physical resource and/or the preset indication parameter to the plurality of terminals, or sending to the plurality of terminals the group where the ACK/NACK information of each terminal of the plurality of terminals locates, and the location of the ACK/NACK information of each terminal in the group.

According to a second aspect of the embodiment, a method for receiving Acknowledgement (ACK)/Negative Acknowledgement (NACK), information is provided, comprising: receiving and demodulating first bit blocks on a predetermined ACK/NACK physical resource, wherein the first bit blocks are X first bit blocks obtained by performing, after dividing ACK/NACK information of a plurality of terminals into X groups, joint coding on ACK/NACK information corresponding to each group of the X groups respectively, wherein X is a positive integer greater than or equal to 1; acquiring ACK/NACK information of the plurality of terminals from the first bit blocks according to a receiving and demodulating result.

In an example embodiment, receiving and demodulating the first bit blocks on the predetermined ACK/NACK physical resource comprises: receiving and demodulating the first bit blocks on the predetermined ACK/NACK physical resource according to signalling information sent by a network side and/or a configuration parameter of the plurality of terminals, wherein the signalling information and/or information carried in the configuration parameter comprise at least one of the followings: the number X of the groups into which the ACK/NACK information of the plurality of terminals is to be divided, the number of bits of ACK/NACK information included in each group of the X groups, sizes of the first bit blocks, a resource mapping manner of the first bit blocks, a location of the predetermined ACK/NACK physical resource, a transmission manner of the predetermined ACK/NACK physical resource, a Demodulation Reference Symbol (DM-RS) port used for transmitting the first bit blocks, whether Cyclic Redundancy Check (CRC) is added to the first bit blocks, and the number of bits of the added CRC, a system bandwidth, a sub-frame type, a Cyclic Prefix (CP) type, and a distribution ratio of Uplink (UL) sub-frames to DownLink (DL) sub-frames.

In an example embodiment, receiving and demodulating the first bit blocks on the predetermined ACK/NACK physical resource comprises: receiving and demodulating the first bit blocks in one predefined resource set in the predetermined ACK/NACK physical resource, wherein a location of the one predefined resource set is fixed, and locations of different first bit blocks in the one predefined resource set are different, or selecting a resource set from a plurality of resource sets in the predetermined ACK/NACK physical resource according to a dedicated Radio Network Temporary Identifier (RNTI) used for receiving ACK/NACK information, and receiving and demodulating the first bit blocks, wherein a rule for selecting the one resource set comprises: selecting the one resource set according to a preset resource size, or selecting the one resource set according to a resource size determined by at least one of the following parameters: a system bandwidth, a sub-frame type, a Cyclic Prefix (CP) type, and a distribution ratio of UL sub-frames to DL sub-frames.

In an example embodiment, the resource mapping manner of the first bit blocks in the one resource set comprises: when an enhanced Control Channel Element, eCCE, is used as a mapping unit, all or some eCCEs in the whole Resource block, RB, are taken to perform mapping, or a plurality of successive or discrete eCCEs are taken to perform mapping, or eCCEs selected at an interval according to a preset rule are taken to perform mapping; when an enhanced Resource Element Group, eREG, is taken as a unit to perform mapping, some eREG units in one eCCE are taken to perform mapping, or some eREG units in a plurality of eCCEs mapped successively or discretely are taken to perform mapping.

In an example embodiment, receiving and demodulating the first bit blocks on the predetermined ACK/NACK physical resource comprises: determining a transmission manner of the first bit blocks in the physical resource, when a distributed mapping manner is applied, a Demodulation Reference Symbol (DM-RS) port of an eREG in discrete eCCEs is the same as a port of an enhanced Physical Downlink Control Channel (ePDCCH) or is a predefined DM-RS port, or is a DM-RS port notified by a signalling of an upper layer, or is a preset dedicated DM-RS port of the ACK/NACK information; when a centralized mapping manner is applied, the same DM-RS antenna port is applied to all eREGs in Physical Resource Block, PRB, pairs occupied by the first bit blocks, the applied antenna port may be the same as a port of an ePDCCH, or is a predefined DM-RS port, or is a DM-RS port notified by a signalling of an upper layer, or is a preset dedicated DM-RS port of the ACK/NACK information, or is a port determined according to a predefined parameter, wherein the predefined parameter comprises at least one of the followings: an index of a current eCCE, a cell identifier, a terminal identifier, and a group index corresponding to the first bit blocks.

In an example embodiment, receiving and demodulating the first bit blocks in the one predefined resource set in the predetermined ACK/NACK physical resource comprises: determining time domain resources corresponding to the first bit blocks according to signaling information; determining the first bit blocks to which the plurality of terminals belong; and determining locations of the ACK/NACK information of the plurality of terminals in the first bit blocks to which the plurality of terminals belong.

In an example embodiment, selecting one resource set from the plurality of resource sets in the predetermined ACK/NACK physical resource according to the dedicated RNTI used for receiving the ACK/NACK information, and receiving and demodulating the first bit blocks comprises: performing, by using the dedicated RNTI used for receiving the ACK/NACK information, a detection in the selected resource set according to a preset resource size or a preset bit block size.

In an example embodiment, obtaining the ACK/NACK information of the plurality of terminals in the first bit blocks comprises: when there is one first bit block, a parameter for determining locations of the ACK/NACK information of the plurality of terminals in the first bit block at least comprises one of the following parameters: the minimum or maximum PRB index $I_{PRB\_RA}$ of PRB of UL resources allocated to the plurality of terminals, a DM-RS cyclic shift value $n_{DMRS}$ in Physical UL Shared Channels (PUSCH) allocated to the plurality of terminals, a size $N_{ePHICH}^{Total}$ of a configured and jointly coded bit block, an index value $k_p$ corresponding to a DM-RS port during performing mapping on the first bit block, and an indication parameter $I_{PHICH}$; or determining directly, through a signaling of an upper layer, the locations of the ACK/NACK information of the plurality of terminals in the first bit block; when there are a plurality of the first bit blocks, a parameter for determining the first bit blocks to which the ACK/NACK information of the plurality of terminals belong, and the locations of the ACK/NACK information of the plurality of terminals in the first bit blocks to which the plurality of terminals belong at least comprises one of the following parameters: the minimum or maximum PRB index $I_{PRB\_RA}$ of PRB of UL resources corresponding to the plurality of terminals, DM-RS cyclic shift values $n_{DMRS}$ in PUSCHs corresponding to the plurality of terminals, a size $N_{ePHICH}^{Total}$ of a configured and jointly coded bit blocks, an index value $k_p$ corresponding to a DM-RS port during performing mapping on the ACK/NACK bit blocks, an indication parameter $I_{PHICH}$, and the X value; or determining directly, through a signaling of an upper layer, the first bit blocks to which the plurality of terminals belong, and the locations of the ACK/NACK information of the plurality of terminals in the first bit blocks to which the plurality of terminals belong.

In an example embodiment, when ACK/NACK bit blocks of the plurality of terminals are not detected at locations of eCCEs or eREGs or in PRBs, or CRC of detected ACK/NACK bit blocks fails to pass verification, the plurality of terminals wait for a network side to perform scheduling again.

In an example embodiment, the number of Resource Element (REs) contained in a physical resource corresponding to the each first bit block of the X first bit blocks comprises at least one of the followings: a preset resource size in an ePDCCH is a size corresponding to 1, 2, 4, 8 or 16 eCCEs; a size corresponding to ½, ¼, or ⅛ of an eCCE formed by available REs in a PRB of one ePDCCH; a size corresponding to m eREGs, wherein m is an integer larger than or equal to 1; a value of the number of the REs indicated by an upper layer signaling or configured directly.

According to a third aspect of the embodiment, a base station is provided, comprising: a grouping component, configured to divide Acknowledgement (ACK)/Negative Acknowledgement (NACK) information of a plurality of terminals into X groups according to a preset indication parameter, wherein X is a positive integer greater than or equal to 1; a coding component, configured to perform joint coding on ACK/NACK information corresponding to each group of the X groups respectively, to obtain X first bit blocks; a sending component, configured to map the X first bit blocks to a predetermined ACK/NACK physical resource and send the X first bit blocks.

In an example embodiment, the coding component comprises at least one of the followings: a first coding element, configured to perform Tail Biting Convolutional Coding (TBCC), on ACK/NACK information corresponding to each group of the groups; a second coding element, configured to perform Reed-Muller (RM) coding on ACK/NACK information corresponding to each group of the groups; a third coding element, configured to perform Dual RM coding on ACK/NACK information corresponding to each group of the groups.

In an example embodiment, the coding component further comprises: an adding element, configured to add Cyclic Redundancy Check (CRC) of 8 bits or 16 bits to the ACK/NACK information corresponding to each group of the groups, wherein the number of bits of the added CRC is a predefined value or a value notified by a signalling.

In an example embodiment, the base station further comprises: a processing element, configured to perform at least one of the following processing on each of the X first bit blocks: rate matching, scrambling and interleaving.

In an example embodiment, the sending component comprises: a first sending element, configured to map the X first bit blocks to one predefined resource set in the predetermined ACK/NACK physical resource and send the X first bit blocks, wherein a location of the one predefined resource set is fixed, ACK/NACK information corresponding to different groups of the X groups corresponds to different locations in the resource set, or a second sending element, configured to perform scrambling on the X first bit blocks according to a dedicated Radio Network Temporary Identifier (RNTI) used for receiving ACK/NACK information, select one resource set from a plurality of resource sets in the predetermined ACK/NACK physical resource to perform mapping and sending, wherein a rule for selecting the one resource set comprises: selecting the one resource set according to a preset resource size, or selecting the one resource set according to a resource size determined by at least one of the following parameters: a system bandwidth, a sub-frame type, a Cyclic Prefix (CP) type, and a distribution ratio of Uplink (UL) sub-frames to Downlink (DL) sub-frames.

In an example embodiment, the sending component further comprises: a first mapping element, configured to, when an enhanced Control Channel Element, eCCE, is used as a mapping unit, perform mapping on all or some eCCEs in the whole Resource block, RB, or perform mapping on a plurality of successive or discrete eCCEs, or eCCEs selected at an interval according to a preset rule are taken to perform mapping; a second mapping element, configured to, when an enhanced Resource Element Group, eREG. is taken as a unit to perform mapping, take some eREG units in one eCCE to perform mapping, or take some eREG units in a plurality of eCCEs mapped successively or discretely to perform mapping.

In an example embodiment, the sending component further comprises: a selecting element, configured to select, in the predetermined ACK/NACK physical resource, a transmission manner of the X first bit blocks, wherein when a distributed mapping manner is applied, a Demodulation Reference Symbol (DM-RS) port of an eREG in an discrete eCCE is the same as a port of an enhanced Physical Downlink Control Channel (ePDCCH) or is a predefined DM-RS port, or is a DM-RS port notified by a signalling of an upper layer, or is a preset dedicated DM-RS port of the ACK/NACK information; when a centralized mapping manner is applied, an applied antenna port is the same as a port of an ePDCCH, or is a predefined DM-RS port, or is a DM-RS port notified by a signalling of an upper layer, or is a preset dedicated DM-RS port of the ACK/NACK information, or is a port determined according to a predefined parameter, wherein the predefined parameter comprises at least one of the followings: an index of a current eCCE, a cell identifier, a terminal identifier, and a group index corresponding to the first bit blocks, wherein the transmission manner of the X first bit blocks comprises a predefined manner or a manner notified via a signalling.

In an example embodiment, the sending component further comprises: a determining element, configured to determine a group where ACK/NACK information of each terminal of the plurality of terminals locates, and location of the ACK/NACK information of each terminal in the group, wherein a parameter for determining the group and the location in the group at least comprises one of the following parameters: the minimum or maximum PRB index $I_{PRB\_RA}$ of PRB of an UL resource allocated to each terminal, a DM-RS cyclic shift value $n_{DMRS}$ in a Physical UL Shared Channel (PUSCH) allocated to each terminal, a size $N_{ePH\_ICH}^{Total}$ of each first bit block of the X first bit blocks, an index value $k_p$ corresponding to a DM-RS port during performing mapping on the first bit blocks, an indication parameter $I_{PHICH}$, and the X value; or determine directly, through a signaling of an upper layer, a group where ACK/NACK information of each terminal of the plurality of terminals locates, and the location of the ACK/NACK information of each terminal in the group.

In an example embodiment, the sending component is further configured to send parameter information of the predetermined ACK/NACK physical resource and/or the preset indication parameter to the plurality of terminals, or send to the plurality of terminals the group where the ACK/NACK information of each terminal of the plurality of terminals locates, and the location of the ACK/NACK information of each terminal in the group.

According to a fourth aspect of the embodiment, a terminal is provided, comprising: a demodulating component, configured to receive and demodulate first bit blocks on a predefined Acknowledgement (ACK)/Negative Acknowledgement (NACK) physical resource, wherein the first bit blocks are X first bit blocks obtained by performing, after dividing ACK/NACK information of a plurality of terminals into X groups, joint coding on ACK/NACK information corresponding to each group of the X groups respectively, wherein X is a positive integer greater than or equal to 1; an acquiring component, configured to acquire the ACK/NACK information of the terminals from the first bit blocks according to a receiving and demodulating result.

In an example embodiment, the demodulating component is configured to receive and demodulate the first bit blocks on the predetermined ACK/NACK physical resource according to signalling information sent by a network side and/or a configuration parameter of the terminals, wherein the signalling information and/or information carried in the configuration parameter comprise at least one of the followings: number X of the groups into which the ACK/NACK information of the plurality of terminals is to be divided, the number of bits of ACK/NACK information included in each group of the X groups, sizes of the first bit blocks, a resource mapping manner of the first bit blocks, a location of the predetermined ACK/NACK physical resource, a transmission manner of the predetermined ACK/NACK physical resource, a Demodulation Reference Symbol (DM-RS) port used for transmitting the first bit blocks, whether Cyclic Redundancy Check (CRC) is added to the first bit blocks, and the number of bits of the added CRC, a system bandwidth, a sub-frame type, a Cyclic Prefix (CP) type, and a distribution ratio of Uplink (UL) sub-frames to Downlink (DL) sub-frames.

In an example embodiment, the demodulating component comprises: a first demodulating element, configured to receive and demodulate the first bit blocks in one predefined resource set in the predetermined ACK/NACK physical resource, wherein a location of the one predefined resource set is fixed, and locations of different first bit blocks in the one predefined resource set are different, or a second demodulating element, configured to select a resource set from a plurality of resource sets in the predetermined ACK/NACK physical resource according to a dedicated Radio Network Temporary Identifier (RNTI) used for receiving ACK/NACK information, and receive and demodulate the first bit blocks, wherein a rule for selecting the one resource set comprises: selecting the one resource set according to a preset resource size, or selecting the one resource set according to a resource size determined by at least one of the following parameters: a system bandwidth, a sub-frame type, a Cyclic Prefix (CP) type, and a distribution ratio of UL sub-frames to DL sub-frames.

In an example embodiment, the demodulating component further comprises: a first selecting element, configured to, when an enhanced Control Channel Element, eCCE, is used as a mapping unit, perform mapping on all or some eCCEs in the whole Resource block, RB, or perform mapping on a plurality of successive or discrete eCCEs, or select eCCEs at an interval according to a preset rule to perform mapping; a second selecting element, configured to, when an enhanced Resource Element Group, eREG, is taken as a unit to perform mapping, take some eREG units in one eCCE to perform mapping, or take some eREG units in a plurality of eCCEs mapped successively or discretely to perform mapping.

In an example embodiment, the demodulating component further comprises: a determining element, configured to determine a transmission manner of the first bit blocks in the physical resource, wherein when a distributed mapping manner is applied, a Demodulation Reference Symbol (DM-RS) port of an eREG in discrete eCCEs is the same as a port of an enhanced Physical Downlink Control Channel (ePDCCH) or is a predefined DM-RS port, or is a DM-RS port notified by a signalling of an upper layer, or is a preset dedicated DM-RS port of the ACK/NACK information; when a centralized mapping manner is applied, the same DM-RS antenna port is applied to all eREGs in Physical Resource Block, PRB, pairs occupied by the first bit blocks, the applied antenna port may be the same as a port of an ePDCCH, or is a predefined DM-RS port, or is a DM-RS port notified by a signalling of an upper layer, or is a predefined dedicated DM-RS port of the ACK/NACK information, or is a port determined according to a predefined parameter, wherein the predefined parameter comprises at least one of the followings: an index of a current eCCE, a cell identifier, a terminal identifier, and a group index corresponding to the first bit blocks.

In an example embodiment, the first demodulating element comprises: a first determining sub-element, configured to determine time domain resources corresponding to the first bit blocks according to signaling information; a second determining sub-element, configured to determine the first bit blocks to which the plurality of terminals belong; and a third determining sub-element, configured to determine locations of the ACK/NACK information of the plurality of terminals in the first bit blocks to which the plurality of terminals belong.

In an example embodiment, the second demodulating element is further configured to perform, by using the dedicated RNTI used for receiving the ACK/NACK information, a detection in the selected resource set according to a preset resource size or a preset bit block size.

By means of the disclosure, ACK/NACK information of a plurality of terminals is divided into X groups according to a preset indication parameter, wherein X is a positive integer greater than or equal to 1; joint coding is performed on ACK/NACK information corresponding to each group of the X groups, so as to obtain X first bit blocks; and the X first bit blocks are mapped to a predetermined ACK/NACK physical resource and sent, thereby solving the problem of a conflict of resource allocation during transmission of ACK/NACK information.

BRIEF DESCRIPTION OF THE DRAWINGS

The accompanying drawings described herein are used for providing further understanding to the disclosure and constitute a part of the application. The exemplary embodiments of the disclosure and the illustration thereof are used for explaining the disclosure, instead of constituting an improper limitation to the disclosure. In the accompanying drawings.

DETAILED DESCRIPTION OF THE EMBODIMENTS

The disclosure will be expounded hereinafter with reference to the accompanying drawings and in combination with the embodiments. It should be noted that, the embodiments in the application and the characteristics in the embodiments may be combined with each other if there is no conflicts.

A design method of an ePHICH based on joint coding of HARQ-ACK information of a plurality of terminals is provided according to an embodiment of the disclosure. The HARQ-ACK information of the plurality of terminals may be transmitted reliably on an NCT via the design method, thereby improving the reliability of transmission of UL data of a low cost terminal while solving problems such as a conflict of PHICH resource allocation and ICIC of a frequency domain in a small cell. All aspects of the embodiments of the disclosure will be described respectively hereinafter.

A base station is provided according to an embodiment of the disclosure.

Figure 1:
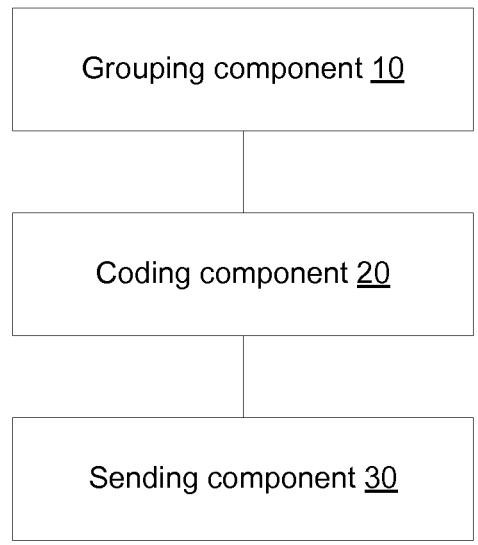
FIG. 1 is a structural block diagram of a base station according to an embodiment of the disclosure.

FIG. 1 is a structural block diagram of a base station according to an embodiment of the disclosure. As shown in FIG. 1, the base station mainly includes: a grouping component 10, a coding component 20 and a sending component 30, wherein the grouping component 10 is configured to divide ACK/NACK information of a plurality of terminals into X groups according to a preset indication parameter, wherein X is a positive integer greater than or equal to 1; the coding component 20 is connected with the grouping component 10 and configured to perform joint coding on ACK/NACK information corresponding to each group of the X groups respectively, to obtain X first bit blocks; the sending component 30 is connected with the coding component 20 and configured to map the X first bit blocks to a predetermined ACK/NACK physical resource and send the X first bit blocks.

In an example embodiment of the disclosure, the preset indication parameter includes, but is not limited to one of the followings: the size of each of the X first bit blocks, the number X of the groups into which the ACK/NACK information of the plurality of terminals is to be divided, the number of bits of the ACK/NACK information corresponding to each group of the X groups obtained after the grouping, and location information corresponding to ACK/NACK information of each terminal of the plurality of terminals.

In an example embodiment of the disclosure, the number of bits occupied by the ACK/NACK information corresponding to one group of the X groups includes, but is not limited to one of the followings: the size of a DCI format 3; the size of a DCI format 1C; a size determined according to indication information, wherein the indication information includes at least one of the followings: a carrier type, a system bandwidth, a service type, an indication signalling, a sub-frame type, a system mode (TDD/Frequency-Division Duplexing (FDD)), a distribution ratio of UL sub-frames to DL sub-frames.

In an example embodiment of the disclosure, the predetermined ACK/NACK physical resource includes, but is not limited to one of the followings: the predetermined ACK/NACK physical resource includes one or more RBs; the predetermined ACK/NACK physical resource occupies one or more the RBs jointly with an ePDCCH; the predetermined ACK/NACK physical resource occupies one or more the RBs jointly with a PDSCH. That is, the predetermined ACK/NACK physical resource may be a dedicated physical resource for transmitting ACK/NACK information, and may a multiplex physical resource with an ePDCCH or a PDSCH.

The predetermined ACK/NACK physical resource includes a time domain resource and a frequency domain resource as follows respectively.

1) The time domain resource of the predetermined ACK/NACK physical resource includes one or more of the following forms: an occupied time domain length is predefined to be a first time slot and/or a second time slot of a sub-frame; a preset OFDM symbol in a predefined sub-frame to be occupied; the serial number of the occupied sub-frame is predefined to be n+k, where n is a serial number of a sub-frame on which a network side receives a Physical Uplink Shared Channel (PUSCH) of a terminal and k is an integer smaller than or equal to 10; a preset part of sub-frames in a predefined wireless frame, wherein the sub-frames of the preset part form a set S and S appears repeatedly with a period of m; an initial OFDM symbol p in a predefined sub-frame, and a value range of p is [0,9].

2) The frequency domain resource of the predetermined ACK/NACK physical resource includes one or more of the following forms: N PRB pairs at two sidebands of a frequency domain, N PRB pairs mapped at equal intervals, N discrete PRB pairs on a frequency band of which a bandwidth is 1.4M and a center is a center frequency point, N fixed and successive PRB pairs of the central frequency point, and N PRB pairs of the first PRB numbers, N PRB pairs indicated by a signalling, wherein N is a preset value, or a parameter for determining a value of N includes at least one of the followings: a system bandwidth, a sub-frame type, a CP type, a system mode (TDD or FDD), a distribution ratio of TDD UL sub-frames to downlink sub-frames.

In an example embodiment of the disclosure, the number of REs contained in a physical resource corresponding to each of the first bit blocks includes at least one of the followings: a preset resource size in an ePDCCH which is a size corresponding to 1, 2, 4, 8 or 16 eCCEs; a size corresponding to ½, ¼, or ⅛ of an eCCE formed by available REs in a PRB of one ePDCCH; a size corresponding to m eREGs, wherein m is an integer larger than or equal to 1 and the number of the REs included in the physical resource may be configured via signalling indication of an upper layer or predefined (configured directly).

In the embodiment of the disclosure, the coding component 20 may perform one or more kinds of coding for the ACK/NACK information of each group of the X groups. In an example the embodiment of the disclosure, the coding component 20 includes at least one of the followings: a first coding element, configured to perform TBCC on ACK/NACK information corresponding to each group of the X groups; a second coding element, configured to perform RM coding on ACK/NACK information corresponding to each group of the X groups; a third coding element, configured to perform Dual RM coding on ACK/NACK information corresponding to each group of the X groups.

Further, in an example embodiment of the disclosure, the ACK/NACK information corresponding to each group of the X groups may be coded by the second coding element or the third coding element first, and the first coding element performs TBCC coding on the coded ACK/NACK information subsequently.

In an example embodiment of the disclosure, a preset amount of CRC may be also added to the ACK/NACK information of each group of the X groups before coding. Therefore, the coding component 20 in the embodiment of the disclosure may further include: an adding element, configured to add CRC of 8 bits or 16 bits to the ACK/NACK information, wherein the number of bits of the added CRC is a predefined value or a value notified by a signalling.

Further, processing including rate matching, scrambling and interleaving and so on may be further performed on the X first bit blocks after the coding component 20 performs the joint coding. Therefore, the base station in an example embodiment of the disclosure may further include: a processing component, configured to perform at least one of the following processing on each first bit block of the X first bit blocks: rate matching, scrambling and interleaving.

In the embodiment of the disclosure, the X first bit blocks may be mapped to the predetermined ACK/NACK physical resource to be sent. During the mapping process, the X first bit blocks may be mapped to a fixed resource of the predetermined ACK/NACK physical resource, or a resource set may be also selected dynamically from a plurality of resource sets of the predetermined ACK/NACK physical resource according to a preset rule.

Therefore, in an example embodiment of the disclosure, the sending component 30 may include: a first sending element, configured to map the X first bit blocks to one predefined resource set in the predetermined ACK/NACK physical resource and send the X first bit blocks, wherein the location of the one predefined resource set is fixed, and the ACK/NACK information corresponding to different groups of the X groups corresponds to different locations in the resource set, or a second sending element, configured to perform scrambling on the X first bit blocks according to a dedicated RNTI used for receiving the ACK/NACK information, select one resource set from a plurality of resource sets in the predetermined ACK/NACK physical resource to perform the mapping and sending, wherein a rule for selecting the one resource set comprises: selecting the one resource set according to a preset resource size, or selecting the one resource set according to a resource size determined by at least one of the following parameters: a system bandwidth, a sub-frame type, a CP type, and a distribution ratio of UL sub-frames to DL sub-frames.

A terminal may perform demodulation at a predefined resource location by mapping a plurality of first bit blocks into a predefined resource set, thereby reducing processing processes including blind detection and so on, and prolonging the processing time of the terminal.

The resource set is selected from the plurality of resource sets to perform the mapping, and especially selected according to the preset resource size, e.g. the resource set is selected according to a preset aggregation level, and a processing process of an ePDCCH may be reused without additional performance evaluation.

Further, sending component 30 further includes: a first mapping element, configured to, when an eCCE is used as a mapping unit, take all or some eCCEs in the whole RB to perform the mapping, or take a plurality of successive or discrete eCCEs to perform the mapping, or select eCCEs at an interval according to a preset rule to perform the mapping; a second mapping element, configured to, when an eREG is taken as a unit to perform mapping, take some eREG units in one eCCE to perform the mapping, or take some eREG units in a plurality of eCCEs mapped successively or discretely to perform the mapping.

In an example embodiment of the disclosure, a transmission manner of the ACK/NACK information may be also selected. Therefore, the sending component 30 further includes: a selecting element, configured to select, in the predetermined ACK/NACK physical resource, a transmission manner of the X first bit blocks, wherein when a distributed mapping manner is applied, a DM-RS port of an eREG in an discrete eCCE is the same as a port of an ePDCCH, or is a predefined DM-RS port, or is a DM-RS port notified by a signalling of an upper layer, or is a preset dedicated DM-RS port of the ACK/NACK information; when a centralized mapping manner is applied, an applied antenna port is the same as a port of an ePDCCH, or is a predefined DM-RS port, or is a DM-RS port notified by a signalling of an upper layer, or is a preset dedicated DM-RS port of the ACK/NACK information, or is a port determined according to a predefined parameter, wherein the predefined parameter includes at least one of the followings: an index of a current eCCE, a cell identifier, a terminal identifier, and a group index corresponding to the first bit blocks, wherein the transmission manner of the X first bit blocks includes a predefined manner or a manner notified via a signalling.

In an optional example, a group where ACK/NACK information of each terminal locates and the location of the ACK/NACK information of each terminal in the group may be determined in the embodiment of the disclosure. Therefore, the sending component 30 further includes: a determining element, configured to determine a group where ACK/NACK information of each terminal of the plurality of terminals locates, and the location of the ACK/NACK information of each terminal in the group, wherein a parameter for determining the group and the location in the group at least includes one of the following parameters: the minimum or maximum PRB index $I_{PRB\_RA}$ of PRB of an UL resource allocated to each terminal, a DM-RS cyclic shift value $n_{DMRS}$ in a PUSCH allocated to each terminal, a size $N_{ePHICH}^{Total}$ of each first bit block of the X first bit blocks, an index value $k_p$ corresponding to a DM-RS port during performing mapping on the first bit blocks, an indication parameter $I_{PHICH}$, and the X value; or determine directly, through a signaling of an upper layer, a group where ACK/NACK information of each terminal of the plurality of terminals locates, and the location of the ACK/NACK information of each terminal in the group.

Further, the base station may further send to the terminals information required by demodulation so that the terminals can receive and demodulate the ACK/NACK information of the plurality of terminals. Therefore, in an example embodiment of the disclosure, the sending component 30 may be further configured to send parameter information of the predetermined ACK/NACK physical resource and/or the preset indication parameter to the plurality of terminals, or send to the plurality of terminals the group where the ACK/NACK information of each terminal of the plurality of terminals locates, and the location of the ACK/NACK information of each terminal in the group, so that each terminal can receive and demodulate the ACK/NACK information on a corresponding ACK/NACK physical resource, so as to obtain the ACK/NACK information of the terminals from the received data.

Corresponding to the base station, a method for sending ACK/NACK information is further provided according to an embodiment of the disclosure.

Figure 2:
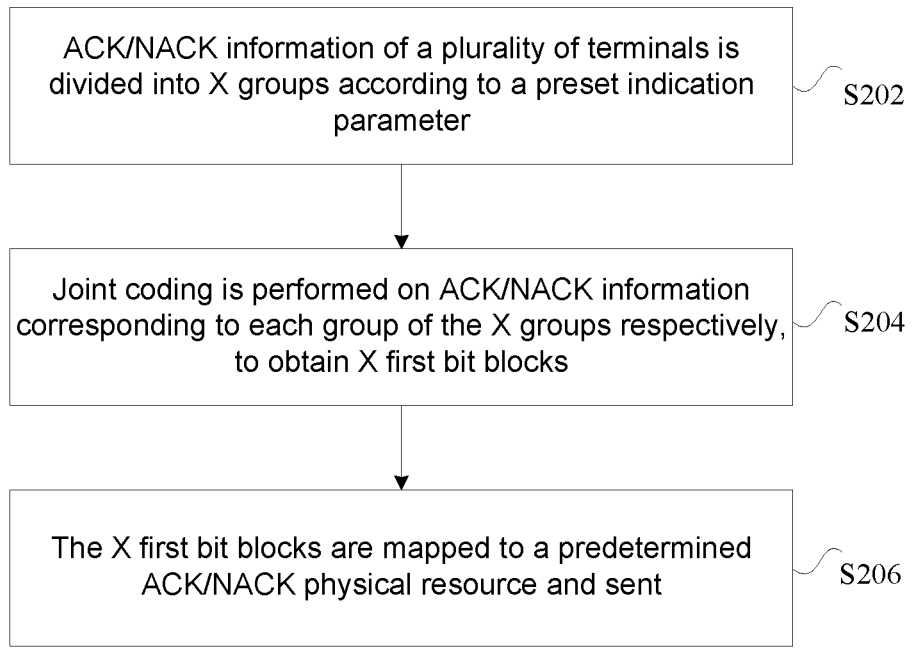
FIG. 2 is a flowchart of a method for sending ACK/NACK information according to an embodiment of the disclosure.

FIG. 2 is a flowchart of a method for sending ACK/NACK information according to an embodiment of the disclosure. As shown in FIG. 2, the method includes Step 202 to Step 206.

Step 202: ACK/NACK information of a plurality of terminals is divided into X groups according to a preset indication parameter, wherein X is a positive integer greater than or equal to 1.

Step 204: Joint coding is performed on ACK/NACK information corresponding to each group in the X groups respectively, so as to obtain X first bit blocks.

Step 206: The X first bit blocks are mapped to a predetermined ACK/NACK physical resource and sent.

In an example implementation method of the embodiment of the disclosure, the preset indication parameter includes, but is not limited to at least one of the followings: the size of each of the X first bit blocks, the number X of the groups of the ACK/NACK information, the number of bits of the ACK/NACK information corresponding to each group obtained after the grouping, and location information corresponding to ACK/NACK information of each terminal of the plurality of terminals.

In an example embodiment of the disclosure, the predetermined ACK/NACK physical resource includes, but is not limited to one of the followings: the predetermined ACK/NACK physical resource includes one or more RBs; the predetermined ACK/NACK physical resource occupies one or more said RBs jointly with an ePDCCH; the predetermined ACK/NACK physical resource occupies one or more the RBs jointly with a PDSCH. That is, the predetermined ACK/NACK physical resource may be a dedicated physical resource for transmitting ACK/NACK information, and may be a multiplex physical resource with an ePDCCH or a PDSCH.

The predetermined ACK/NACK physical resource includes a time domain resource and a frequency domain resource as follows respectively.

1) The time domain resource of the predetermined ACK/NACK physical resource includes one or more of the following forms: an occupied time domain length is predefined to be a first time slot and/or a second time slot of a sub-frame; a preset OFDM symbol in a predefined sub-frame to be occupied; the serial number of the occupied sub-frame is predefined to be n+k, where n is a serial number of a sub-frame on which a network side receives a Physical Uplink Shared Channel (PUSCH) of a terminal and k is an integer smaller than or equal to 10; a preset part of sub-frames in a predefined wireless frame, wherein the sub-frames of the preset part form a set S and S appears repeatedly with a period of m; an initial OFDM symbol p in a predefined sub-frame, and a value range of p is [0,9].

2) The frequency domain resource of the predetermined ACK/NACK physical resource includes one or more of the following forms: N PRB pairs at two sidebands of a frequency domain, N PRB pairs mapped at equal intervals, N discrete PRB pairs on a frequency band of which a bandwidth is 1.4M and a center is a center frequency point, N fixed and successive PRB pairs of the central frequency point, and N PRB pairs of the first PRB numbers, N PRB pairs indicated by a signalling, wherein N is a preset value, or a parameter for determining a value of N includes at least one of the followings: a system bandwidth, a sub-frame type, a CP type, a system mode (TDD or FDD), a distribution ratio of TDD UL sub-frames to downlink sub-frames.

In an optional implementation method of the embodiment of the disclosure, the joint coding is performed on the ACK/NACK information corresponding to each group of the X groups respectively, including at least one of the followings that TBCC is performed; RM coding is performed; and Dual RM coding is performed. One or more kinds of coding may be performed on the ACK/NACK information corresponding to each group in the embodiment of the disclosure.

Further, after the RM coding or the Dual RM coding is performed on the ACK/NACK information corresponding to each group of the X groups respectively, the TBCC may be further performed on the ACK/NACK information corresponding to each group of the X groups respectively, so as to obtain the X first bit blocks. In other words, in an optional implementation method of the embodiment of the disclosure, the RM coding or the Dual RM coding may be performed on the ACK/NACK information corresponding to each group of the X groups first, and the TBCC is performed on the bit blocks obtained through the coding so as to obtain the X first bit blocks.

In an optional implementation method of the embodiment of the disclosure, the number of bits included in the ACK/NACK information included in one group of the X groups includes, but is not limited to one of the followings: the size of a DCI format 3; the size of a DCI format 1C; a size determined according to indication information, wherein the indication information includes at least one of the followings: a carrier type, a system bandwidth, a service type, an indication signalling, a sub-frame type, a system mode (TDD or FDD), a distribution ratio of UL sub-frames to downlink sub-frames.

In an example implementation method of the embodiment of the disclosure, the joint coding is performed on the ACK/NACK information corresponding to each group of the groups further includes that CRC of 8 bits or 16 bits is added to the ACK/NACK information corresponding to each group obtained after the grouping, wherein the number of bits of the added CRC is a predefined value or a value notified by a signalling.

Further, the joint coding is performed on the ACK/NACK information corresponding to each group in the X groups respectively further includes that at least one of the following processing is performed on each of the X first bit blocks: rate matching, scrambling and interleaving.

In an optional implementation method of the embodiment of the disclosure, the number of REs contained in a physical resource corresponding to each first bit block of the X first bit blocks includes at least one of the followings: a preset resource size in an ePDCCH which is a size corresponding to 1, 2, 4, 8 or 16 eCCEs; a size corresponding to ½, ¼, or ⅛ of an eCCE formed by available REs in a PRB of one ePDCCH; a size corresponding to m eREGs, wherein m is an integer larger than or equal to 1, wherein the number of the REs contained in the physical resource may be indicated by a signalling of an upper layer or may be also predefined (configured directly).

In the embodiment of the disclosure, the X first bit blocks may be mapped to the predetermined ACK/NACK physical resource to be sent. During the mapping process, the X first bit blocks may be mapped to a fixed resource set in the predetermined ACK/NACK physical resource, or a resource set which may be also selected dynamically from a plurality of resource sets in the predetermined ACK/NACK physical resource according to a preset rule.

In an optional implementation method of the embodiment of the disclosure, the X first bit blocks are mapped to the predetermined ACK/NACK physical resource and sent includes that the X first bit blocks are mapped to one predefined resource set in the predetermined ACK/NACK physical resource and sent, wherein the location of the one predefined resource set is fixed, ACK/NACK information corresponding to different groups of the X groups corresponds to different locations in the resource set, or scrambling is performed on the X first bit blocks by using a dedicated RNTI for receiving the ACK/NACK information, one of a plurality of resource sets in the predetermined ACK/NACK physical resource is selected to perform the mapping and sending, wherein a rule for selecting the one resource set comprises: selecting the one resource set according to a preset resource size, or selecting the one resource set according to a resource size determined by at least one of the following parameters: a system bandwidth, a sub-frame type, a CP type, and a distribution ratio of UL sub-frames to downlink sub-frames.

A terminal may perform demodulation at a predefined resource location by mapping a plurality of first bit blocks into a predefined resource set, thereby reducing processing processes including blind detection and so on, and prolonging the processing time of the terminal.

The resource set is selected from the plurality of resource sets to perform the mapping, and especially selected according to the preset resource size, e.g. the resource set is selected according to a preset aggregation level, and a processing process of an ePDCCH may be reused without additional performance evaluation.

Further, when an eCCE is used as a mapping unit, all or some eCCEs in the whole RB are taken to perform mapping, or a plurality of successive or discrete eCCEs are taken to perform mapping, or eCCEs selected at an interval according to a preset rule are taken to perform mapping; when an eREG is taken as a unit to perform mapping, some eREG units in one eCCE are taken to perform mapping, or some eREG units in a plurality of eCCEs mapped successively or discretely are taken to perform mapping.

In an optional implementation method of the embodiment of the disclosure, the X first bit blocks are mapped to the predetermined ACK/NACK physical resource and sent further includes that a transmission manner of the X first bit blocks is selected in the predetermined ACK/NACK physical resource, wherein when a distributed mapping manner is applied, a DM-RS port of an eREG in an discrete eCCE is the same as a port of an ePDCCH, or is a predefined DM-RS port, or is a DM-RS port notified by a signalling of an upper layer, or is a preset dedicated DM-RS port of the ACK/NACK information; when a centralized mapping manner is applied, the same DM-RS antenna port is applied to all eREGs, the applied antenna port is the same as a port of an ePDCCH, or is a predefined DM-RS port, or is a DM-RS port notified by a signalling of an upper layer, or is a dedicated DM-RS port of the preset ACK/NACK information, or is a port determined according to a predefined parameter, wherein the predefined parameter includes at least one of the followings: an index of a current eCCE, a cell identifier, a terminal identifier, and a group index corresponding to the first bit blocks, wherein the transmission manner of the X first bit blocks includes a predefined manner or a manner notified via a signalling.

Further, the method further includes that parameter information of the predetermined ACK/NACK physical resource and/or the preset indication information is sent to the plurality of terminals.

In an optional implementation method of the embodiment of the disclosure, the X first bit blocks are mapped to the predetermined ACK/NACK physical resource and sent further includes that a group where ACK/NACK information of each terminal of the plurality of terminals locates, and the location of the ACK/NACK information of each terminal in the group are determined, wherein a parameter for determining the group and the location in the group at least includes one of the following parameters: the minimum or maximum PRB index $I_{PRB\_RA}$ of PRB of an UL resource allocated to each terminal, a DM-RS cyclic shift value $n_{DMRS}$ in a PUSCH allocated to each terminal, the size $N_{ePHICH}^{Total}$ of the configured and jointly-coded bit block (i.e. each of the X first bit blocks), an index value $k_p$ corresponding to a DM-RS port during performing mapping on the first bit blocks, an indication parameter $I_{PHICH}$, and the X value; or a group where ACK/NACK information of each terminal of the plurality of terminals locates, and the location of the ACK/NACK information of each terminal in the ACK/NACK information group are determined through a signaling of an upper layer directly.

A terminal is further provided according to an embodiment of the disclosure.

Figure 3:
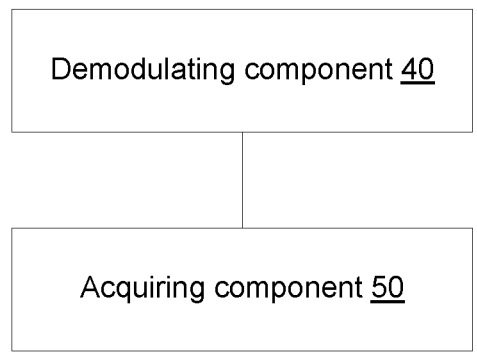
FIG. 3 is a structural block diagram of a terminal according to an embodiment of the disclosure.

FIG. 3 is a structural block diagram of a terminal according to an embodiment of the disclosure. As shown in FIG. 3, the terminal mainly includes a demodulating component 40, and an acquiring component 50, wherein the demodulating component 40 is configured to receive and demodulate first bit blocks on a predefined ACK/NACK physical resource, wherein the first bit blocks are X first bit blocks obtained by performing, after dividing ACK/NACK information of a plurality of terminals into X groups, joint coding on ACK/NACK information corresponding to each group of the X groups respectively, wherein X is a positive integer greater than or equal to 1; the acquiring component 50 is connected with the demodulating component 40 and is configured to acquire the ACK/NACK information of the plurality of terminals from the first bit blocks according to a receiving and demodulating result.

In an example implementation method of the embodiment of the disclosure, the demodulating component 40 is configured to receive and demodulate the first bit blocks on the predetermined ACK/NACK physical resource according to signalling information sent by a network side and/or a configuration parameter of the plurality of terminals, wherein the signalling information and/or information carried in the configuration parameter include at least one of the followings: the number X of the groups into which the ACK/NACK information of the plurality of terminals is to be divided, the number of bits of ACK/NACK information included in each group of the X groups, the sizes of the first bit blocks, a resource mapping manner of the first bit blocks, the location of the predetermined ACK/NACK physical resource, a transmission manner of the predetermined ACK/NACK physical resource, a DM-RS port for transmitting the first bit blocks, whether CRC is added to the first bit blocks, and the number of bits of the added CRC, a system bandwidth, a sub-frame type, a CP type, and a distribution ratio of UL sub-frames to downlink sub-frames.

In an optional implementation method of the embodiment of the disclosure, the demodulating component 40 includes: a first demodulating element, configured to receive and demodulate the first bit blocks in one predefined resource set in the predetermined ACK/NACK physical resource, wherein the location of the one predefined resource set is fixed, and locations of different first bit blocks in the one predefined resource set are different, or a second demodulating element, configured to select a resource set from a plurality of resource sets in the predetermined ACK/NACK physical resource by using a dedicated RNTI used for receiving ACK/NACK information, and receive and demodulate the first bit blocks, wherein a rule for selecting the one resource set comprises: selecting the one resource set according to a preset resource size, or selecting the one resource set according to a resource size determined by at least one of the following parameters: a system bandwidth, a sub-frame type, a CP type, and a distribution ratio of UL sub-frames to downlink sub-frames.

In an example embodiment, the demodulating component further 40 includes: a first selecting element, configured to, when an eCCE is used as a mapping unit, take all or some eCCEs in the whole RB to perform mapping, or take a plurality of successive or discrete eCCE to perform mapping, or take eCCEs selected at an interval according to a preset rule to perform the mapping; a second selecting element, configured to, when an eREG is taken as a unit to perform mapping, take some eREG units in one eCCE to perform mapping, or take some eREG units in a plurality of eCCEs mapped successively or discretely to perform mapping.

In an example embodiment, the demodulating component 40 further includes: a determining element, configured to determine a transmission manner of the first bit blocks in the physical resource, wherein when a distributed mapping manner is applied, a DM-RS port of an eREG in discrete eCCEs is the same as a port of an ePDCCH, or is a predefined DM-RS port, or is a DM-RS port notified by a signalling of an upper layer, or is a preset dedicated DM-RS port of the ACK/NACK information; when a centralized mapping manner is applied, the same DM-RS antenna port is applied to all eREGs in PRB pairs occupied by the first bit blocks, the applied antenna port may be the same as a port of an ePDCCH, or is a predefined DM-RS port, or is a DM-RS port notified by a signalling of an upper layer, or is a preset dedicated DM-RS port of the ACK/NACK information, or is a port determined according to a predefined parameter, wherein the predefined parameter includes at least one of the followings: an index of a current eCCE, a cell identifier, a terminal identifier, and a group index corresponding to the first bit blocks.

In an optional example, the first demodulating element includes: a first determining sub-element, configured to determine time domain resources corresponding to the first bit blocks according to the signaling information; a second determining sub-element, configured to determine the first bit blocks to which the plurality of terminals belong; and a third determining sub-element, configured to determine the locations of the ACK/NACK information of the plurality of terminals in the first bit blocks to which the plurality of terminals belong.

In an optional example, the second demodulating element is further configured to perform, by using the dedicated RNTI used for receiving the ACK/NACK information, a detection in the selected resource set according to a preset resource size or a preset bit block size.

Corresponding to the terminal, a method for receiving ACK/NACK information is further provided according to an embodiment of the disclosure.

Figure 4:
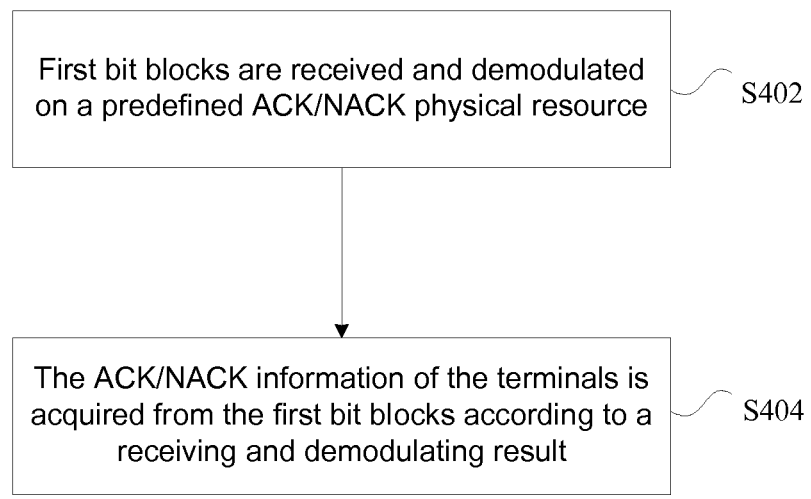
FIG. 4 is a flowchart of a method for receiving ACK/NACK information according to an embodiment of the disclosure.

FIG. 4 is a flowchart of a method for receiving ACK/NACK information according to an embodiment of the disclosure. As shown in FIG. 4, the method includes Step 402 to Step 406.

Step 402: First bit blocks are received and demodulated on a predetermined ACK/NACK physical resource, wherein the first bit blocks are X first bit blocks obtained by performing, after dividing ACK/NACK information of a plurality of terminals into X groups, joint coding on ACK/NACK information corresponding to each group of the X groups respectively, wherein X is a positive integer greater than or equal to 1.

Step 404: The ACK/NACK information of the plurality of terminals is acquired from the first bit blocks according to a receiving and demodulating result.

In an example implementation method of the embodiment of the disclosure, the first bit blocks are received and demodulated on the predetermined ACK/NACK physical resource includes that the first bit blocks are received and demodulated on the predetermined ACK/NACK physical resource according to signalling information sent by a network side and/or a configuration parameter of the plurality of terminals.

Further, the signalling information and/or information carried in the configuration parameter include/includes at least one of the followings: the number X of the groups into which the ACK/NACK information of the plurality of terminals is to be divided, the number of bits of ACK/NACK information included in each group of the X groups, the sizes of the first bit blocks, a resource mapping manner of the first bit blocks, the location of the predetermined ACK/NACK physical resource, a transmission manner of the predetermined ACK/NACK physical resource, a DM-RS port used for transmitting the first bit blocks, whether CRC is added to the first bit blocks, and the number of bits of the added CRC, a system bandwidth, a sub-frame type, a CP type, and a distribution ratio of UL sub-frames to downlink sub-frames.

In an example implementation method of the embodiment of the disclosure, the first bit blocks are received and demodulated on the predetermined ACK/NACK physical resource includes that the first bit blocks are received and demodulated in one predefined resource set in the predetermined ACK/NACK physical resource, wherein the location of the resource set is fixed, and the locations of resource sets of ACK/NACK information of terminals corresponding to different groups are different, or a resource set is selected from a plurality of resource sets in the predetermined ACK/NACK physical resource by using a dedicated RNTI used for receiving ACK/NACK information, and the first bit blocks are received and demodulated, wherein a rule for selecting the one resource set comprises: selecting the one resource set according to a preset resource size, or selecting the one resource set according to a resource size determined by at least one of the following parameters: a system bandwidth, a sub-frame type, a CP type, and a distribution ratio of UL sub-frame to downlink sub-frames.

Further, in an example implementation method of the embodiment of the disclosure, the resource mapping method of the first bit blocks in the resource set includes that when an eCCE is used as a mapping unit, all or some eCCEs in the whole RB are taken to perform mapping, or a plurality of successive or discrete eCCEs are taken to perform mapping, or eCCEs selected at an interval according to a preset rule to perform the mapping are taken to perform mapping; when an eREG is taken as a unit to performing mapping, some eREG units in one eCCE are taken to perform mapping, or some eREG units in a plurality of eCCEs mapped successively or discretely are taken to perform mapping.

In an example implementation method of the embodiment of the disclosure, the first bit blocks are received and demodulated on the predetermined ACK/NACK physical resource includes that a transmission manner of the first bit blocks in the physical resource is determined, wherein 1) when a distributed mapping manner is applied, a DM-RS port of an eREG in discrete eCCEs is the same as a port of an ePDCCH, or is a predefined DM-RS port, or is a DM-RS port notified by a signalling of an upper layer, or is a preset dedicated DM-RS port of the ACK/NACK information;

2) when a centralized mapping manner is applied, the same DM-RS antenna port is applied to all eREGs in PRB pairs occupied by the first bit blocks, the applied antenna port may be the same as a port of an ePDCCH, or is a predefined DM-RS port, or is a DM-RS port notified by a signalling of an upper layer, or is a preset dedicated DM-RS port of the ACK/NACK information, or is a port determined according to a predefined parameter, wherein the predefined parameter includes at least one of the followings: an index of a current eCCE, a cell identifier, a UE identifier, and a group index corresponding to the first bit blocks.

In an example implementation method of the embodiment of the disclosure, the first bit blocks are received and demodulated in the one predefined resource set includes that time domain resource corresponding to the first bit blocks are determined according to the signaling information; the first bit blocks to which the plurality of terminals belong are determined; and the locations of the ACK/NACK information of the plurality of terminals in the first bit blocks to which the plurality of terminals belong are determined.

In an example implementation method of the embodiment of the disclosure, a resource is selected from a plurality of resources in the resource set by using a dedicated RNTI used for receiving the ACK/NACK information to receive and demodulate the first bit blocks includes that a detection is performed according to a preset resource size or a preset bit block size in the resource set by using the dedicated RNTI used for receiving the ACK/NACK information.

Further, the ACK/NACK information of the terminals is obtained in the first bit blocks includes that 1) when there is one first bit block, a parameter for determining the locations of the ACK/NACK information of the plurality of terminals in the first bit block at least includes one of the following parameters: the minimum or maximum PRB index $I_{PRB\_RA}$ of PRB of UL resources allocated to the plurality of terminals, a DM-RS cyclic shift value $n_{DMRS}$ in PUSCHs allocated to the plurality of terminals, the size $N_{ePHICH}^{Total}$ of the configured and jointly coded bit block, an index value k corresponding to a DM-RS port during performing mapping on the first bit block, and an indication parameter $I_{PHICH}$; or the locations of the ACK/NACK information of the plurality of terminals in the first bit block are determined directly through a signaling of an upper layer;

2) when there are a plurality of first bit blocks, a parameter for determining the first bit blocks to which the ACK/NACK information of the plurality of terminals belong, and the locations of the ACK/NACK information of the plurality of terminals in the first bit blocks to which the plurality of terminals belong at least includes one of the following parameters: the minimum or maximum PRB index $I_{PRB\_RA}$ of PRB of UL resources corresponding to the plurality of terminals, a DM-RS cyclic shift values $n_{DMRS}$ in PUSCHs corresponding to the plurality of terminals, the size $N_{ePHICH}^{Total}$ of the configured and jointly coded bit blocks, an index value $k_p$ corresponding to a DM-RS port during performing mapping on the ACK/NACK bit blocks, an indication parameter $I_{PHICH}$, and the X value; or the first bit blocks to which the plurality of terminals belong, and the locations of the ACK/NACK information of the plurality of terminals in the first bit blocks to which the plurality of terminals belong are determined directly through a signaling of an upper layer.

In an example, if the ACK/NACK bit blocks of the terminals are not detected at the locations of the eCCEs or the eREGs or in the PRBs, or CRC of detected ACK/NACK bit blocks fails to pass verification, the terminals wait for a network side to perform scheduling again.

In an example implementation method of the embodiment of the disclosure, the number of REs contained in a physical resource corresponding to each first bit block of the X first bit blocks includes at least one of the followings that a preset resource size in an ePDCCH is a size corresponding to 1, 2, 4, 8 or 16 eCCEs; a size corresponding to ½, ¼, or ⅛ of an eCCE formed by available REs in a PRB of one ePDCCH; a size corresponding to m eREGs, wherein m is an integer larger than or equal to 1, wherein a value of the number of the REs contained in the physical resource may be indicated by a signaling of an upper layer or configured directly.

The foregoing solution will be further described with a solution combining a base station side and a terminal side in order to understand the foregoing solution of the application.

A design method of an ePHICH based on HARQ-ACK bit (i.e. ACK/NACK information) joint coding of a plurality of terminals includes the following steps.

Step 1: A network side predefines a time domain resource and a frequency domain resource of an ePHICH. The network side performs joint coding on an HARQ-ACK bit, and then performs rate matching optionally, performs scrambling and interleaving optionally, and then performs a processing process of mapping to a physical resource.

Step 2: A receiving side determines locations of a time domain and a frequency domain of the ePHICH by receiving a related parameter, and performs demodulation to obtain an HARQ-ACK bit block, and determines the location of an HARQ-ACK bit of a terminal in the demodulated bit block.

In Step 1, the network side predefines a time domain resource of ACK/NACK information, i.e. the time domain resource of the ePHICH. The predefined time domain resource includes: an occupied sub-frame and an initial OFDM symbol may be predefined, wherein the predefined occupied sub-frame is the $(n+k)^{th}$, wherein n is the number of a sub-frame on which a base station receives a PUSCH of the terminal and k is an integer smaller than or equal to 10; or some sub-frames in a wireless frame are predefined to transmit the ePHICH. These sub-frames form a set S, and S appears repeatedly with a period of n. The initial OFDM symbol in the predefined sub-frame is symbol m and a value range of m is [0.9]. A time domain length of the ePHICH is predefined as the first time slot or the second time slot, or two time slots of the sub-frame; specific time domain OFDM symbols in a sub-frame is predefined to occupy, and the specific time domain OFDM symbols may be successive OFDM symbols, or specific discrete OFDM symbols.

Predefined time domain information of the ePHICH is notified to the terminal via signalings. The signalings form a structural body, the content in which includes one or more of the following parameters: a period for indicating configuration of a predefined sub-frame of the ePHICH, a sub-frame used by the ePHICH, an OFDM symbol used by the ePHICH, and the location of an initial OFDM symbol of the ePHICH. This signalling structure is carried in a Master Information Block (MIB) of a PBCH, or is notified to the terminal via a dedicated Radio Resource Control (RRC) message of the terminal.

Figure 5:
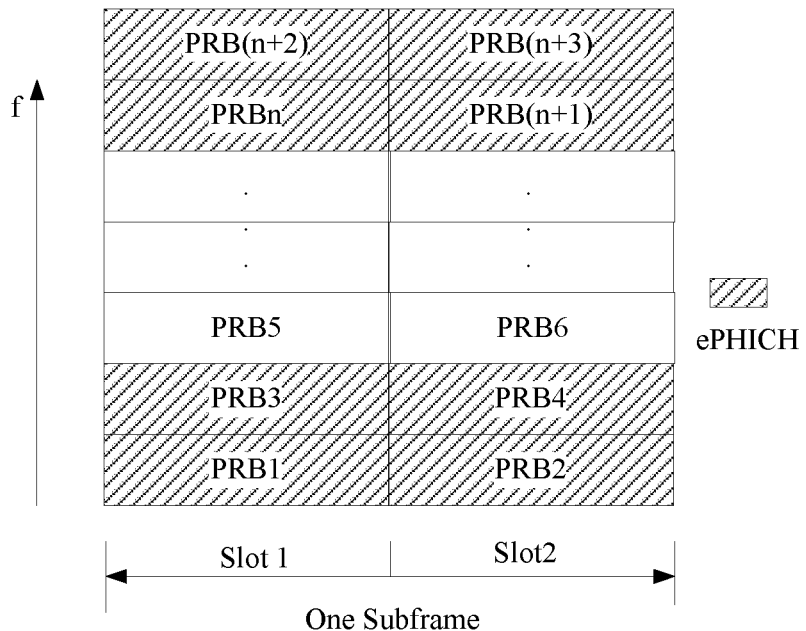
FIG. 5 is the first schematic diagram of a location of a frequency domain resource according to an embodiment of the disclosure.
Figure 6:
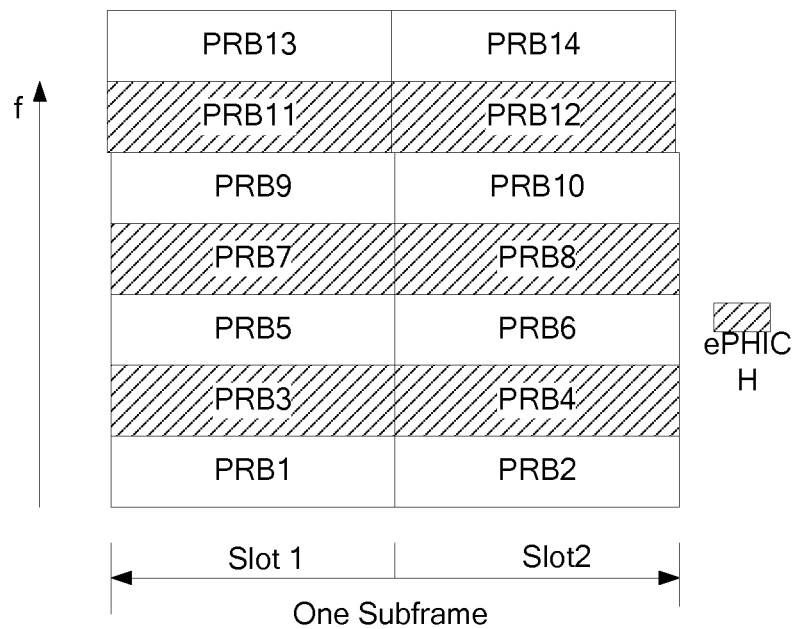
FIG. 6 is the second schematic diagram of a location of a frequency domain resource according to an embodiment of the disclosure.
Figure 7:
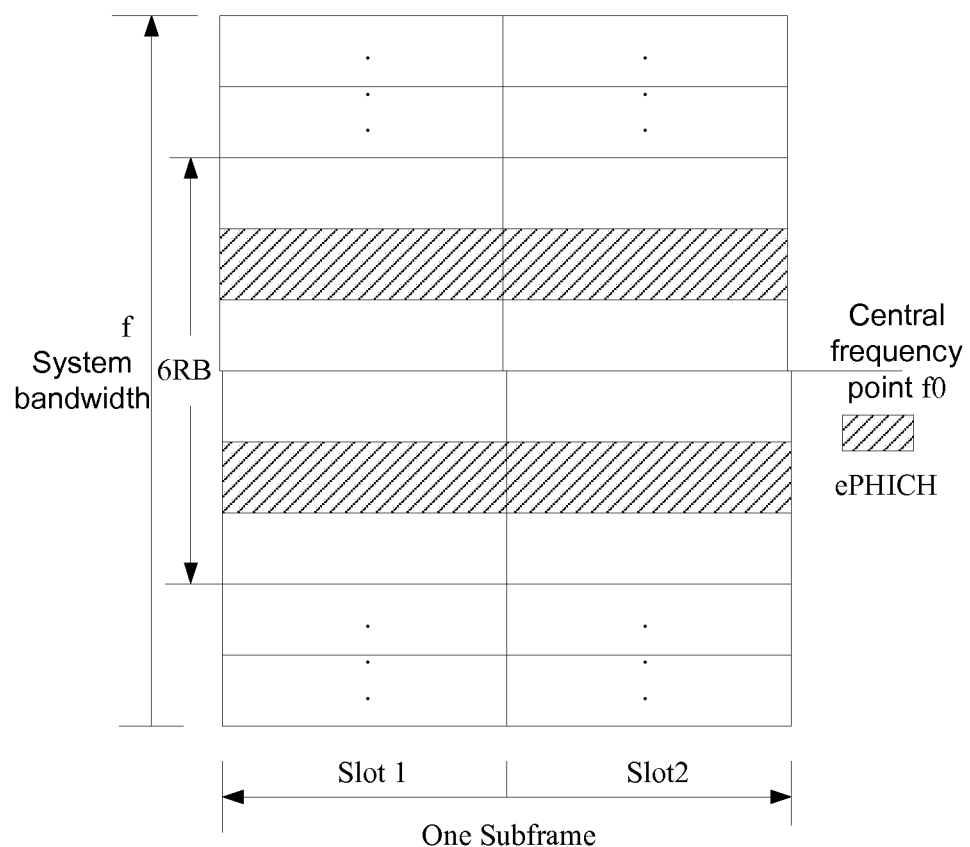
FIG. 7 is the third schematic diagram of a location of a frequency domain resource according to an embodiment of the disclosure.
Figure 8:
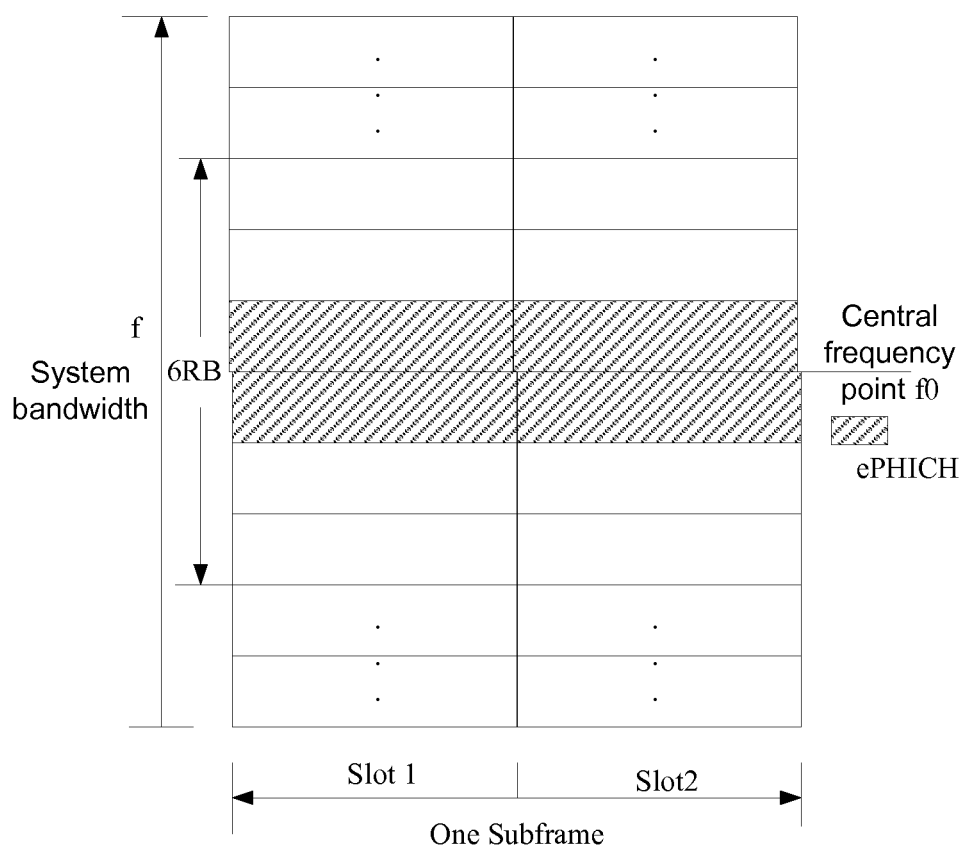
FIG. 8 is the fourth schematic diagram of a location of a frequency domain resource according to an embodiment of the disclosure.
Figure 9:
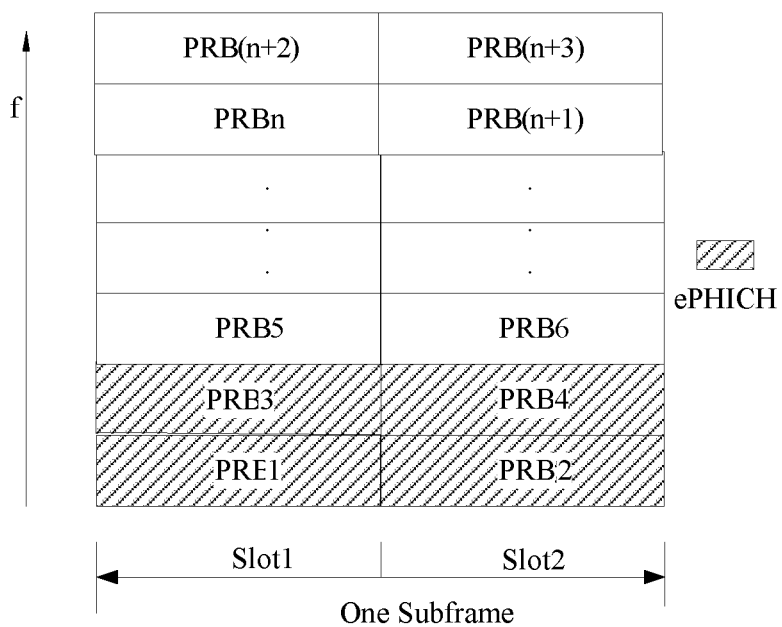
FIG. 9 is the fifth schematic diagram of a location of a frequency domain resource according to an embodiment of the disclosure.

The predefined time domain resource of the ePHICH includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a predefined value, or a value of N is determined according to at least one of the following parameters: a system bandwidth, a sub-frame type (an MBMSFN sub-frame or a non-MBMSFN sub-frame) and a CP type, a system mode (TDD OR FDD), and a distribution ratio of TDD UL sub-frames to DL sub-frames.

The predefined physical resource of the ACK/NACK information includes one or more RBs, and is not occupied at the same RB with an ePDCCH or a PDSCH at the moment; or the predefined physical resource of the ACK/NACK information occupies one or more RBs with an ePDCCH jointly, or the predefined physical resource of the ACK/NACK information occupies one or more RBs with a PDSCH jointly.

Predefined frequency domain information of the ePHICH is notified to the terminal through signalings. The signallings form a structural body, the content of which includes one or more of the following parameters: when initial PRB locations and the number of PRBs for determining the ePHICH are indicated, the signallings indicate specific numbers of PRB pairs for discrete PRBs, and the signallings indicate initial locations and values of N of PRB pairs for successive PRBs; the signallings are carried in an MIB message of a PBCH, or notified to the terminal through a dedicated RRC message of the terminal.

HARQ-ACK bits of the plurality of terminals are subjected to perform joint coding, and the size of bit blocks obtained after the joint coding is the size of the existing DCI Format 3, or the size of a DCI Format 1C, or a new size m, where m may be 5≤m≤10, or based on parameters including a carrier type and a system bandwidth or a service type and so on, the base station side may configure the size of the bit blocks obtained after the joint coding. When the system bandwidth is smaller than k RBs, or the carrier type is an MTC carrier or a the service type is an Semi-Persisting Scheduling (SPS) service, bit blocks with relatively small sizes are configured, e.g., the size of the DCI format 1C, or a new size m is designed, where 5≤m≤10. When the system bandwidth is larger than k RBs, bit blocks with relatively large sizes are configured, e.g. the size of a DCI format 3A.

The system flexibility may be greatly improved by the foregoing method. In a scenario that there is a smaller number of users in the system, or there is a small amount of user UL data, a relatively small Size of the bit blocks obtained after the joint coding may be used. Otherwise, bit blocks having a relatively large size may be used, or a plurality of bit blocks having a relatively small size are used, and the use efficiency of resources of the system is improved simultaneously.

Whether CRC bits are added to the bit blocks obtained after the joint coding is determined by a specific service requirement. CRC bits are not added, or CRC of 8 bits is added, or CRC of 16 bits is added. For example, CRC bits are not added in scenarios including a small cell and so on, or in an MTC scenario, or when the system bandwidth is relatively small. CRC of 16 bits may be added when an ePHICH and an ePDCCH are subjected to perform multiplexing, and if blind detection is used during reception.

A processing process of the bit blocks obtained after the joint coding includes that TBCC is performed on HARQ-ACK bit blocks of the plurality of terminals first, and then rate matching and scrambling are performed optionally, and processes including interleaving and so on are performed optionally, or RM coding is performed on the HARQ-ACK bit blocks of the plurality of terminals first (TBCC) coding is performed subsequently, and then rate matching and scrambling are performed optionally, and processes including interleaving and so on are performed optionally, or Dual RM coding is performed on the HARQ-ACK bit blocks of the plurality of terminals first (TBCC) coding is performed subsequently, and then rate matching and scrambling are performed optionally, and processes including interleaving and so on are performed optionally. A coding gain of the bit blocks may be improved through the foregoing coding processes, thereby further improving the transmission reliability of HARQ-ACK bits.

The involved sizes of the bit blocks obtained after the rate matching may apply sizes corresponding to aggregation levels of 1, 2, 4, 8 and 16 eCCEs of an existing ePDCCH, or redefined sizes of ½ and ¼ of an eCCE, or a size corresponding to m eREGs, wherein m is an integer larger than or equal to 1. More effective ePHICH bits may be transmitted on a unit frequency domain resource (e.g. an RE) by defining different sizes, thereby improving the use efficiency of resources of the system.

The bits blocks processed by processes including the joint coding, the optional rate matching, the optional scrambling and interleaving and so on are mapped to a physical PRB resource according to the following methods.

The base station side reserves fixed eCCE resources, configures a corresponding eCCE resource for each ePHICH group, and the size of the resource may be a size corresponding to 1, 2, 4, 8 or 16 eCCEs, or a redefined size of ½ or ¼ of an eCCE, or a size corresponding to m eREGs, wherein m is an integer larger than or equal to 1; each ePHICH group corresponds to a fixed location, and different ePHICH groups correspond to different locations. HARQ-ACK coded bits not added with CRC bits are mapped to corresponding fixed eCCE locations; or the base station side performs, by using a dedicated RNTI of HARQ-ACK, scrambling on the CRC generated during HARQ-ACK bit coding, and performs mapping according to certain aggregation levels, and these aggregation levels include 1, 2, 4, 8, and 16 eCCEs and so on.

The base station side reserves fixed eCCE/eREG resources so that the terminal can perform demodulation at predefined resource locations, thereby reducing processing processes including blind detection and so on, and greatly prolonging the processing time of the ePHICH. The base station side performs mapping on HARQ-ACK bits according a processing process of an ePDCCH and a certain aggregation level, and the terminal performs blind detection on an ePHICH group according to an allocated HARQ-ACK dedicated RNTI. Such processing can largely reuse a processing process of an existing ePDCCH without additional performance evaluation and so on.

Selection of ports and transmission manner: the ePHICH performs mapping by using an eCCE or an eREG as a unit. When an eCCE is taken as a unit to perform mapping, the mapping may be performed on all eCCEs in the whole RB, or the mapping is performed on some eCCE in the whole RB, or the mapping is performed on some eCCES in a plurality of RBs mapped continuously, or the mapping is performed on some eCCEs in a plurality of RBs mapped discretely. The numbers of the used eCCEs are continuous, or eCCEs are selected at intervals according to a certain rule to perform the mapping. Or, when an eREG is taken as a unit to perform mapping, some eREG units in an eCCE may be used, or some eREG units in a plurality of eCCEs having continuous numbers or in a plurality of discrete eCCEs may be used.

When the ePHICH applies a distributed mapping manner, a DM-RS port of an eREG in discrete eCCEs may apply the same port as an ePDCCH, e.g. port 107, port 108, port 109, or port 110, or a predefined port, or a DM-RS port notified by a signalling of an upper layer, which is different from a DM-RS port used by the ePDCCH by predefining the port or notifying the port via the signalling of the upper layer, or a DM-RS port of a redefined ePHICH, e.g. port 207, or port 208, or port 209, or port 210, or a DM-RS port determined according to a predefined parameter, wherein the predefined parameter includes at least one of the followings: a index of a current eCCE, a cell identifier, a terminal identifier, a group index corresponding to the first bit block.

When the ePHICH applies a centralized mapping manner, all eREGs in PRB pairs occupied by the ePHICH may apply the same DM-RS port, and the port may apply the same port as an ePDCCH, e.g. port 107, port 108, port 109, or port 110, or a predefined DM-RS port, or a DM-RS port notified by a signalling of an upper layer, which is different from a DM-RS port used by the ePDCCH by predefining the port or notifying the port via the signalling of the upper layer, or a DM-RS port of a redefined ePHICH, e.g. port 207, or port 208, or port 209, or port 210, or a DM-RS port determined according to a predefined parameter, wherein the predefined parameter includes at least one of the followings: a index of a current eCCE, a cell identifier, a terminal identifier, a group index corresponding to the first bit block.

The ePHICH uses a random Beamforming manner of a single-antenna port, or a manner of transmitting a diversity.

Information including the sizes of the bit blocks obtained after the joint coding, and/or the number of bit block groups obtained after the joint coding, and/or the sizes of the bit blocks obtained after the rate matching, and/or the number of the added CRC bits, and/or a transmission of the ePHICH and so on is notified to the terminal via signallings, and these signallings are carried in MIB messages of a PBCH.

In Step 2, processing of the receiver includes the following selections.

Selection 1: The receiver obtains a time domain resource corresponding to the ePHICH via related signalling information in an MIB, and then determines an ePHICH group corresponding to the receiver via a related equation.

Wherein the signalling information and/or information carried by the configuration parameter includes at least one of the followings: the number X of the groups of the ACK/NACK information of the plurality of terminals, the number of bits of ACK/NACK information included in each of the groups, the size of the bit blocks obtained through the joint coding, a resource mapping manner of the bit blocks obtained through the joint coding, the location of the predetermined ACK/NACK physical resource, a transmission manner of the predetermined ACK/NACK physical resource, a DM-RS port for transmitting the bit blocks obtained through the joint coding, whether CRC is added to the bit blocks obtained through the joint coding, and the number of the added bits, a system bandwidth, a sub-frame type, a CP type, and a distribution ratio of UL sub-frames to downlink sub-frames.

Whether there is one or more ePHICH groups may be determined according to the size of a HARQ-ACK bit configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly according to the following method.

$$n_{ePHICH}^{index} = (I_{PRB\_RA} + n_{DMRS}) \bmod N_{ePHICH}^{Total} + I_{PHICH} N_{ePHICH}^{Total};$$

or $$n_{ePHICH}^{index} = (I_{PRB\_RA} + n_{DMRS} + I_{PHICH} + k_p) \bmod N_{ePHICH}^{Total};$$

or $$n_{ePHICH}^{index} = (I_{PRB\_RA} + n_{DMRS} + k_p) \bmod N_{ePHICH}^{Total} + I_{PHICH} N_{ePHICH}^{Total};$$

or $$n_{ePHICH}^{index} = (I_{PRB\_RA} + n_{DMRS} + I_{PHICH}) \bmod N_{ePHICH}^{Total};$$

wherein in the foregoing formulae, $I_{PRB\_RA}$ denotes the minimum/maximum PRB index of UL resources allocated to the terminal, $n_{DMRS}$ s denotes a DM-RS cyclic shift value in a PUSCH allocated to the terminal, $N_{ePHICH}^{Total}$ denotes the size of configured and jointly coded HARQ-ACK bits, $I_{PHICH}$ is an indication parameter whose value is an integer of 0 to 9, $k_p$ is an index value corresponding to a DM-RS port when mapping is performed with the ePHICH.

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index} = (I_{PRB\_RA} + n_{DMRS}) \bmod M + I_{PITCH} M$$

$$n_{ePHICH}^{index} = (\lfloor I_{PRB\_RA}/M \rfloor + n_{DMRS}) \bmod N_{ePHICH}^{Total};$$

$$n_{ePHICH}^{group\_index} = (I_{PRB\_RA} + n_{DMRS} + k_p) \bmod M + I_{PHICH} M$$

or $$n_{ePHICH}^{index} = (\lfloor I_{PRB\_RA}/M \rfloor + n_{DMRS} + k_p) \bmod N_{ePHICH}^{Total};$$

$$n_{ePHICH}^{group\_index} = (I_{PRB\_RA} + n_{DMRS} + I_{PHICH}) \bmod M$$

or $$n_{ePHICH}^{index} = (\lfloor I_{PRB\_RA}/M \rfloor + n_{DMRS} + I_{PHICH}) \bmod N_{ePHICH}^{Total};$$

$$n_{ePHICH}^{group\_index} = (I_{PRB\_RA} + n_{DMRS} + I_{PHICH} + k_p) \bmod M$$

$$n_{ePHICH}^{index} = (\lfloor I_{PRB\_RA}/M \rfloor + n_{DMRS} + I_{PHICH} + k_p) \bmod N_{ePHICH}^{Total};$$

$$n_{ePHICH}^{group\_index} = (I_{PRB\_RA} + n_{DMRS} + I_{PHICH}) \bmod M$$

or $$n_{ePHICH}^{index} = (I_{PRB\_RA} + n_{DMRS} + I_{PHICH}) \bmod N_{ePHICH}^{Total};$$

$$n_{ePHICH}^{group\_index} = (I_{PRB\_RA} + n_{DMRS}) \bmod M + I_{PHICH} M$$

or $$n_{ePHICH}^{index} = (\lfloor I_{PRB\_RA}/M \rfloor + n_{DMRS} + I_{PHICH}) \bmod N_{ePHICH}^{Total};$$

$$n_{ePHICH}^{group\_index} = (I_{PRB\_RA} + n_{DMRS}) \bmod M + I_{PHICH} M$$

or $$n_{ePHICH}^{index} = (I_{PRB\_RA} + n_{DMRS} + I_{PHICH}) \bmod N_{ePHICH}^{Total};$$

$$n_{ePHICH}^{group\_index} = (I_{PRB\_RA} + n_{DMRS} + k_p) \bmod M + I_{PHICH} M$$

or $$n_{ePHICH}^{index} = (I_{PRB\_RA} + n_{DMRS} + I_{PHICH} + k_p) \bmod N_{ePHICH}^{Total};$$

$$n_{ePHICH}^{group\_index} = (I_{PRB\_RA} + n_{DMRS}) \bmod M + I_{PHICH} M$$

or $$n_{ePHICH}^{index} = (\lfloor I_{PRB\_RA}/M \rfloor) \bmod N_{ePHICH}^{Total};$$

$$n_{ePHICH}^{group\_index} = I_{PRB\_RA} \bmod M + I_{PHICH} M$$

or $$n_{ePHICH}^{index} = (\lfloor I_{PRB\_RA}/M \rfloor + n_{DMRS}) \bmod N_{ePHICH}^{Total},$$

wherein in the foregoing formulae, $I_{PRB\_RA}$ denotes the minimum/maximum PRB index of UL resources allocated to the terminal, $n_{DMRS}$ denotes a DM-RS cyclic shift value in a PUSCH allocated to the terminal, M denotes the number of the configured ePHICH groups, $N_{ePHICH}^{Total}$ denotes the size of configured and jointly-coded HARQ-ACK bits, $I_{PHICH}$ is an indication parameter whose value is an integer of 0 to 9, $k_p$ is an index value corresponding to a DM-RS port when mapping is performed with the ePHICH.

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eCCE resource location corresponding to the determined ePHICH group to obtain the HARQ-ACK bit blocks, and then a HARQ-ACK bit location of the terminal in the ePHICH group is determined according to the foregoing formulae or notification of the signalling of the upper layer.

If the terminal fails to detect an ePHICH at a predefined location, the terminal only waits for the base station to perform scheduling again at the moment, thereby avoiding interference caused by error retransmission on an UL.

Selection 2: the receiver performs blind detection on the ePHICH by using a corresponding PHICH-RNTI to detect an ePHICH group where HARQ/ACK of the terminal locates, wherein the used signalling information and/or information carried in a configuration parameter includes at least one of the followings: the number X of the groups of the ACK/NACK information of the plurality of terminals, the number of bits of ACK/NACK information included in each of the X groups, the size of the bit blocks obtained through the joint coding, a resource mapping manner of the bit blocks obtained through the joint coding, the location of the predetermined ACK/NACK physical resource, a transmission manner of the predetermined ACK/NACK physical resource, a DM-RS port for transmitting the bit blocks obtained through the joint coding, whether CRC is added to the bit blocks obtained through the joint coding, and the number of bits of the added CRC, a system bandwidth, a sub-frame type, a CP type, and a distribution ratio of UL sub-frames to downlink sub-frames. A HARQ-ACK bit location of the terminal in the ePHICH group is determined by the following formulae or a signalling of an upper layer:

$$n_{ePHICH}^{index} = (I_{PRB\_RA} + n_{DMRS}) \bmod N_{ePHICH}^{Total} + I_{PHICH} N_{ePHICH}^{Total};$$

or $$n_{ePHICH}^{index} = (I_{PRB\_RA} + n_{DMRS} + I_{PHICH} + k_p) \bmod N_{ePHICH}^{Total};$$

or $$n_{ePHICH}^{index} = (I_{PRB\_RA} + n_{DMRS} + k_p) \bmod N_{ePHICH}^{Total} + I_{PHICH} N_{ePHICH}^{Total};$$

or $$n_{ePHICH}^{index} = (I_{PRB\_RA} + n_{DMRS} + I_{PHICH}) \bmod N_{ePHICH}^{Total},$$

wherein in the foregoing formulae, $I_{PRB\_RA}$ denotes the minimum/maximum PRB index of UL resources allocated to the terminal, $n_{DMRS}$ denotes a DM-RS cyclic shift value in a PUSCH allocated to the terminal, $N_{ePHICH}^{Total}$ denotes the size of configured and jointly coded HARQ-ACK bits, $I_{PHICH}$ is an indication parameter whose value is an integer of 0 to 9, $k_p$ is an index value corresponding to a DM-RS port when mapping is performed with the ePHICH.

If the terminal fails to detect an ePHICH, or a CRC bit of an ePHICH decoded bit fails to pass verification, the terminal only waits for the base station to perform scheduling again, thereby avoiding interference caused by error retransmission on an UL.

The terminal side applies the first selection to perform processing by default, and the terminal performs receiving processing according to the second selection when the base station notifies, through an MIC signalling, the terminal to apply the second selection.

The disclosure will be expounded below in combination with the embodiments.

It needs to be noted that only the situation that an ePDCCH carrying an ePHICH is mapped independently in a specific PRB during a processing process of a terminal side and a receiving side in the following embodiments. The embodiments are also applicable to the situation that an ePHICH and an ePDCCH are reused in the same RB. Only one of the corresponding situations is enumerated in the embodiments of the disclosure, and is included in the protection scope of the disclosure as long as states of specific properties are consistent.

Embodiment 1

In the embodiment of the disclosure, a time domain resource is predefined, joint coding is performed, and the size of a bit block obtained after the joint coding is equal to the size of the DCI Format1C, wherein CRC is not added, the size obtained by the rate matching is the same as the size of an existing aggregation level, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the predefined occupied sub-frame is n+k sub-frame, where n sub-frame is a sub-frame when a base station receives a PUSCH of a terminal and k is an integer smaller than or equal to 10; or it is predefined that some sub-frames belong to a set S, using n as a period; the predefined initial OFDM symbol is m, and a value range of m is [0,7]; it is predefined that a time domain length is the first time slot, or the second time slot, or two time slots of the sub-frame; specific time domain OFDM symbols in the occupied sub-frame is predefined, the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB messages of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of the PRB pairs for the discrete PRBs, and the signallings indicate the initial locations and the N value of PRB pairs for continuous PRBs. The signallings are carried in the MIB messages of the PBCH.

Joint coding is performed on HARQ-ACK bits of a plurality of terminals, the size of bit blocks obtained after the joint coding may apply a size of an existing DCI Format 1C, and CRC bits are not added to the bit blocks obtained after the joint coding.

TBCC is performed on the bit blocks obtained after the joint coding, the processes including rate matching and scrambling, and interleaving and so on are performed subsequently, wherein an involved size of the bit blocks obtained after the rate matching applies a size corresponding to an aggregation level of 1, 2, 4, 8 or 16 eCCEs of an existing ePDCCH.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that an eCCE is taken as a unit to perform mapping on the ePHICH, and a discrete mapping manner is applied. Port 107 and port 108 are selected alternatively as a DM-RS port in an eREG in a D-eCCE, and the used DM-RS occupies 12 REs. A random Beamforming manner of a single-antenna port is applied on the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured in the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index} = (I_{PRB\_RA} + n_{DMRS}) \bmod N_{ePHICH}^{Total} + I_{PHICH} N_{ePHICH}^{Total}.$$

When a plurality of ePHICH groups are defined, a resource of an HARQ-ACK group of the terminal and a resource in the group are obtained dynamically through the scheduled UL parameters $I_{PRB\_RA}$ and $n_{DMRS}$ of the terminal:

$$n_{ePHICH}^{group\_index} = (I_{PRB\_RA} + n_{DMRS}) \bmod M + I_{PHICH} M$$

$$n_{ePHICH}^{index} = (\lfloor I_{PRB\_RA}/M \rfloor + n_{DMRS}) \bmod N_{ePHICH}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eCCE resource location corresponding to the determined ePHICH group to obtain the HARQ-ACK bit blocks, and then a HARQ-ACK bit location of the terminal in the ePHICH group is determined according to the foregoing formulae or the notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 2

In the embodiment of the disclosure, a time domain resource is predefined, joint coding and RM coding are performed, and the size of a bit block obtained after the joint coding is equal to the size of the DCI Format1C, wherein CRC is not added, the size obtained by the rate matching is the same as an existing aggregation level, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k sub-frame, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB messages of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB messages of the PBCH.

Joint coding is performed on HARQ-ACK bits of a plurality of terminals, the size of bit blocks obtained after the joint coding may be the size of an existing DCI Format 1C, and CRC bits are not added to the bit blocks obtained after the joint coding.

RM coding is performed first on the bit blocks obtained after the joint coding (TBCC) is performed subsequently, processing processes including rate matching and scrambling, and interleaving and so on are performed subsequently, wherein an involved size of the bit blocks obtained after the rate matching may apply a size corresponding to an aggregation level of 1, 2, 4, 8 or 16 eCCEs of an existing ePDCCH.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that the ePHICH is performed mapping by using an eCCE as a unit, and applies a discrete mapping method. Port 107 and port 108 are selected alternatively as a DM-RS port of an eREG in a D-eCCE, and the used DM-RS occupies 12 REs. A random Beamforming manner of a single-antenna port is applied in the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index} = (I_{PRB\_RA} + n_{DMRS}) \bmod N_{ePHICH}^{Total} + I_{PHICH} N_{ePHICH}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index} = (I_{PRB\_RA} + n_{DMRS}) \bmod M + I_{PHICH} M$$

$$n_{ePHICH}^{index} = (\lfloor I_{PRB\_RA}/M \rfloor + n_{DMRS}) \bmod N_{ePHICH}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eCCE resource location corresponding to the determined ePHICH group to obtain the HARQ-ACK bit blocks, and then a HARQ-ACK bit location of the terminal in the ePHICH group is determined according to the foregoing formulae or the notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 3

In the embodiment of the disclosure, a time domain resource is predefined, joint coding and Dual RM coding is performed, and the size of a bit block obtained after the joint coding is equal to the size of the DCI Format 1C, wherein CRC is not added, the size obtained by the rate matching is the same as an existing aggregation level, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k sub-frame, where n sub-frame is a sub-frame when a base station receives a PUSCH of a terminal and k is an integer smaller than or equal to 10; or it is predefined that some sub-frames belong to a set S, using n as a period; the predefined initial OFDM symbol is m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB messages of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB messages of the PBCH.

Joint coding is performed on HARQ-ACK bits of a plurality of terminals, the size of bit blocks obtained after the joint coding may be a size of an existing DCI Format 1C, and CRC bits are not added to the bit blocks obtained after the joint coding.

Dual RM coding is performed first on the bit blocks obtained after the joint coding (TBCC) is performed subsequently, processing processes including rate matching and scrambling, and interleaving and so on are performed subsequently.

Wherein an involved size of the bit blocks obtained after the rate matching applies a size corresponding to an aggregation level of 1, 2, 4, 8 or 16 eCCEs of an existing ePDCCH.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that the ePHICH is performed mapping by using an eCCE as a unit, and applies a discrete mapping manner. Port 107 and port 108 are selected alternatively as a DM-RS port of an eREG in a D-eCCE, and the used DM-RS occupies 12 REs. A random Beamforming manner of a single-antenna port is applied on the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index} = (I_{PRB\_RA} + n_{DMRS}) \bmod N_{ePHICH}^{Total} + I_{PHICH} N_{ePHICH}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index} = (I_{PRB\_RA} + n_{DMRS}) \bmod M + I_{PHICH} M$$

$$n_{ePHICH}{}^{index}=(\lfloor I_{PRB\_RA}/M\rfloor+n_{DMRS})\bmod N_{ePHICH}{}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eCCE resource location corresponding to the determined ePHICH group to obtain the HARQ-ACK bit blocks, and then a HARQ-ACK bit location of the terminal in the ePHICH group is determined according to the foregoing formulae or notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 4

In the embodiment of the disclosure, a time domain resource is predefined, joint coding is performed, and the size of a bit block obtained after the joint coding is equal to the size of the DCI Format1C, wherein CRC is not added, the size obtained by the rate matching is a redefined size of ½ or ¼ of an eCCE, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k sub-frame, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB message of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB message of the PBCH.

Joint coding is performed on HARQ-ACK bits of a plurality of terminals, the size of bit blocks obtained after the joint coding may be a size of an existing DCI Format 1C, and CRC bits are not added to the bit blocks obtained after the joint coding.

TBCC is performed on the HARQ-ACK bit blocks obtained after the joint coding, processing processes including rate matching and scrambling, and interleaving and so on are performed subsequently, wherein involved sizes of the bit blocks obtained after the rate matching apply sizes corresponding to predefined sizes of ½ and ¼ of an eCEE.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that the ePHICH is performed mapping by using an eCCE as a unit, and applies a discrete mapping manner. Port 107 and port 108 are selected alternatively as a DM-RS port of an eREG in a D-eCCE, and the used DM-RS occupies 12 REs. A random Beamforming method of a single-antenna port is applied in the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}{}^{index}=(I_{PRB\_RA}+n_{DMRS})\bmod N_{ePHICH}{}^{Total}+I_{PHICH}N_{ePHICH}{}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}{}^{group\_index}=(I_{PRB\_RA}+n_{DMRS})\bmod M+I_{PHICH}M$$

$$n_{ePHICH}{}^{index}=(\lfloor I_{PRB\_RA}/M\rfloor+n_{DMRS})\bmod N_{ePHICH}{}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eCCE resource location corresponding to the determined ePHICH group to obtain the HARQ-ACK bit blocks, and then a HARQ-ACK bit location of the terminal in the ePHICH group is determined according to the foregoing formulae or the notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 5

In the embodiment of the disclosure, a time domain resource is predefined, joint coding is performed, and the size of a bit block obtained after the joint coding is equal to the size of the DCI Format1C, wherein CRC is not added, the size obtained by the rate matching is an integral multiple of a size of the redefined eREG, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k sub-frame, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m sub-frame, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB message of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB message of the PBCH.

Joint coding is performed on HARQ-ACK bits of a plurality of terminals, the size of bit blocks obtained after the joint coding may apply a size of an existing DCI Format 1C, and CRC bits are not added to the bit blocks obtained after the joint coding.

TBCC is performed on the bit blocks obtained after the joint coding, processing processes including rate matching and scrambling, and interleaving and so on are performed subsequently, wherein an involved size of the bit blocks obtained after the rate matching applies a size corresponding to m eREGs and m is an integer larger than or equal to 1.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that the ePHICH is performed mapping by using an eREG as a unit, and applies a discrete mapping method. Port 107 and port 108 are selected alternatively as a DM-RS port of an eREG dispersed in a plurality of RBs, and the used DM-RS occupies 12 REs. A random Beamforming method of a single-antenna port is applied on the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index} = (I_{PRB\_RA} + n_{DMRS}) \bmod N_{ePHICH}^{Total} + I_{PHICH} N_{ePHICH}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index} = (I_{PRB\_RA} + n_{DMRS}) \bmod M + I_{PHICH} M$$

$$n_{ePHICH}^{index} = (\lfloor I_{PRB\_RA}/M \rfloor + n_{DMRS}) \bmod N_{ePHICH}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eREG resource location corresponding to the determined ePHICH group to obtain the HARQ-ACK bit blocks, and then a HARQ-ACK bit location of the terminal in the ePHICH group is determined according to the foregoing formulae or notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 6

In the embodiment of the disclosure, a time domain resource is predefined, joint coding is performed, and the size of a bit block obtained after the joint coding is equal to the size of the DCI Format1C, wherein CRC is not added, the size obtained by the rate matching is the same as an existing aggregation level, mapping is performed at a fixed resource location, centralized transmission is performed and a common DM-RS port is applied.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k sub-frame, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB message of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB message of the PBCH.

Joint coding is performed on HARQ-ACK bits of a plurality of terminals, the size of bit blocks obtained after the joint coding may apply a size of an existing DCI Format 1C, and CRC bits are not added to the bit blocks obtained after the coding.

TBCC is performed on the HARQ-ACK bit blocks obtained after the joint coding, processing processes including rate matching and scrambling, and interleaving and so on are performed subsequently, wherein an involved size of the bit blocks obtained after the rate matching applies a size corresponding to an aggregation level of 1, 2, 4, 8 or 16 eCCEs of an existing ePDCCH.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that the ePHICH is performed mapping by using an eCCE as a unit, and applies a centralized mapping method. The same DM-RS antenna port is applied to all eREGs in PRB pairs occupied by the ePHICH. The port is port 107 or port 108, and a specific port is predefined or acquired by means of the notification of a signalling of an upper layer. A random Beamforming method of a single-antenna port is applied on the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index}=(I_{PRB\_RA}+n_{DMRS}) \bmod N_{ePHICH}^{Total}+I_{PHICH}N_{ePHICH}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index}=(I_{PRB\_RA}+n_{DMRS}) \bmod M+I_{PHICH}M$$

$$n_{ePHICH}^{index}=(\lfloor I_{PRB\_RA}/M \rfloor+n_{DMRS}) \bmod N_{ePHICH}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eCCE resource location corresponding to the determined ePHICH group to obtain the HARQ-ACK bit blocks, and then the HARQ-ACK bit location of the terminal in the ePHICH group is determined according to the foregoing formulae or the notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 7

In the embodiment of the disclosure, a time domain resource is predefined, joint coding is performed, and the size obtained after the joint coding is a new size different from the size of the existing DCI, wherein CRC is not added, the size obtained by the rate matching is a redefined size of ½ or ¼ of an eCCE, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k sub-frame, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB message of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signalings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB message of the PBCH.

Joint coding is performed on HARQ-ACK bits of a plurality of terminals, the size of bit blocks obtained after the joint coding may apply a redesigned size m, where 5≤m≤10, and CRC bits are not added to the bit blocks obtained after the joint coding.

TBCC is performed on the bit blocks obtained after the joint coding, processing processes including rate matching and scrambling, and interleaving and so on are performed subsequently, wherein involved sizes of the bit blocks obtained after the rate matching apply sizes corresponding to predefined sizes of ½ and ¼ of an eCEE.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that the ePHICH is performed mapping by using an eCCE as a unit, and applies a discrete mapping method. Port 107 and port 108 are selected alternatively as a DM-RS port of an eREG in a D-eCCE, and the used DM-RS occupies 12 REs. A random Beamforming method of a single-antenna port is applied in the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index}=(I_{PRB\_RA}+n_{DMRS})\bmod N_{ePHICH}^{Total}+I_{PHICH}N_{ePHICH}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index}=(I_{PRB\_RA}+n_{DMRS})\bmod M+I_{PHICH}M$$

$$n_{ePHICH}^{index}=(\lfloor I_{PRB\_RA}/M\rfloor+n_{DMRS})\bmod N_{ePHICH}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eCCE resource location corresponding to the determined ePHICH group to obtain the HARQ-ACK bit blocks, and then a HARQ-ACK bit location of the terminal in the ePHICH group is determined according to the foregoing formulae or the notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 8

In the embodiment of the disclosure, a time domain resource is predefined, joint coding is performed, and the size obtained after the joint coding is a new size different from the size of an existing DCI, wherein CRC is not added, the size obtained by the rate matching is an integral multiple of a redefined eREG, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k sub-frame, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB message of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB message of the PBCH.

Joint coding is performed on HARQ-ACK bits of a plurality of terminals, the size of bit blocks obtained after the joint coding may apply a redesigned size m, where 5≤m≤10, and CRC bits are not added to the bit blocks obtained after the joint coding.

TBCC is performed on the bit blocks obtained after the joint coding, processing processes including rate matching and scrambling, and interleaving and so on are performed subsequently, wherein an involved size of the bit blocks obtained after the rate matching applies a size corresponding to m eREGs and m is an integer larger than or equal to 1.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that the ePHICH is performed mapping by using an eREG as a unit, and applies a discrete mapping method. Port 107 and port 108 are selected alternatively as a DM-RS port in eREGs dispersed in a plurality of RBs, and the used DM-RS occupies 12 REs. A random Beamforming method of a single-antenna port is applied on the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index} = (I_{PRB\_RA} + n_{DMRS}) \bmod N_{ePHICH}^{Total} + I_{PHICH} N_{ePHICH}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index} = (I_{PRB\_RA} + n_{DMRS}) \bmod M + I_{PHICH} M$$

$$n_{ePHICH}^{index} = (\lfloor I_{PRB\_RA}/M \rfloor + n_{DMRS}) \bmod N_{ePHICH}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eREG resource location corresponding to the determined ePHICH group to obtain the HARQ-ACK bit blocks, and then a HARQ-ACK bit location of the terminal in the ePHICH group is determined according to the foregoing formulae or the notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 9

In the embodiment of the disclosure, a time domain resource is predefined, joint coding is performed, and the size obtained after the joint coding is optional based on a bandwidth or system, wherein CRC is not added, the size obtained by the rate matching is a size of an existing aggregation level, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB message of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB message of the PBCH.

Joint coding is performed on HARQ-ACK bits of a plurality of terminals, the size of bit blocks obtained after the joint coding may be configured by the base station side based on parameters including a carrier type and a system bandwidth or a service type and so on. When the system bandwidth is smaller than k RBs, or when the carrier type is an MTC carrier or the system type is an SPS service, bit blocks with relatively small sizes are configured, e.g. the size of the DCI format 1C, or a new size m is designed 5≤m≤10. When the system bandwidth is larger than k RBs, bit blocks with relatively large sizes are configured, e.g. the size of the DCI format 3A. CRC bits are not added to the bit blocks obtained after the joint coding.

TBCC is performed on the bit blocks obtained after the joint coding, processing processes including rate matching and scrambling, and interleaving and so on are performed subsequently, wherein an involved size of the bit blocks obtained after the rate matching applies a size corresponding to an aggregation level of 1, 2, 4, 8, or 16 eCEEs of an existing ePDCCH.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that the ePHICH is performed mapping by using an eCCE as a unit, and applies a discrete mapping method. Port 107 and port 108 are selected alternatively as a DM-RS port of an eREG in a D-eCCE, and the used DM-RS occupies 12 REs. A random Beamforming method of a single-antenna port is applied on the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index} = (I_{PRB\_RA} + n_{DMRS}) \bmod N_{ePHICH}^{Total} + I_{PHICH} N_{ePHICH}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index} = (I_{PRB\_RA} + n_{DMRS}) \bmod M + I_{PHICH} M$$

$$n_{ePHICH}^{index} = (\lfloor I_{PRB\_RA}/M \rfloor + n_{DMRS}) \bmod N_{ePHICH}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eCCE resource location corresponding to the determined ePHICH group to obtain the HARQ-ACK bit blocks, and then a HARQ-ACK bit location of the terminal in the ePHICH group is determined according to the foregoing formulae or the notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 10

In the embodiment of the disclosure, a time domain resource is predefined, joint coding is performed, and the size obtained after the joint coding is optional based on a bandwidth or system, wherein CRC is not added, the size obtained by the rate matching is a redefined size of ½ or ¼ of an eCCE, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k sub-frame, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB message of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB message of the PBCH.

Joint coding is performed on HARQ-ACK bits of a plurality of terminals, the size of bit blocks obtained after the joint coding may be configured by the base station side based on parameters including a carrier type and a system bandwidth or a service type and so on. When the system bandwidth is smaller than k RBs, or when the carrier type is an MTC carrier or the service type is an SPS service, bit blocks with relatively small sizes are configured, e.g. the size of the DCI format 1C, or a new size m is designed $5 \leq m \leq 10$. When the system bandwidth is larger than k RBs, bit blocks with relatively large sizes are configured, e.g. the size of a DCI format 3A. CRC bits are not added to the bit blocks obtained after the joint coding.

TBCC is performed on the bit blocks obtained after the joint coding, processing processes including rate matching and scrambling, and interleaving and so on are performed subsequently, wherein an involved size of the bit blocks obtained after the rate matching applies a redefined size corresponding ½ or ¼ of an eCEE.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that the ePHICH is performed mapping by using an eCCE as a unit, and applies a discrete mapping method. Port 107 and port 108 are selected alternatively as a DM-RS port of an eREG in a D-eCCE, and the used DM-RS occupies 12 REs. A random Beamforming method of a single-antenna port is applied on the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index} = (I_{PRB\_RA} + n_{DMRS}) \bmod N_{ePHICH}^{Total} + I_{PHICH} N_{ePHICH}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index} = (I_{PRB\_RA} + n_{DMRS}) \bmod M + I_{PHICH} M$$

$$n_{ePHICH}^{index} = (\lfloor I_{PRB\_RA}/M \rfloor + n_{DMRS}) \bmod N_{ePHICH}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eCCE resource location corresponding to the determined ePHICH group to obtain the HARQ-ACK bit blocks, and then a HARQ-ACK bit location of the terminal in the ePHICH group is determined according to the foregoing formulae or the notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 11

In the embodiment of the disclosure, a time domain resource is predefined, joint coding is performed, and the size obtained after the joint coding is optional based on a bandwidth or system, wherein CRC is not added, the size obtained by the rate matching is a redefined size of a multiple of an eREG, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k sub-frame, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB message of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB message of the PBCH.

Joint coding is performed on HARQ-ACK bits of a plurality of terminals, the size of bit blocks obtained after the joint coding may be configured by the base station side based on parameters including a carrier type and a system bandwidth or a service type and so on. When the system bandwidth is smaller than k RBs, or when the carrier type is an MTC carrier or the service type is an SPS service, bit blocks with relatively small sizes are configured, e.g. the size of the DCI format 1C, or a new size m is designed 5≤m≤10. When the system bandwidth is larger than k RBs, bit blocks with relatively large sizes are configured, e.g. the size of a DCI format 3A. CRC bits are not added to the bit blocks obtained after the joint coding.

TBCC is performed on the bit blocks obtained after the joint coding, processing processes including rate matching and scrambling, and interleaving and so on are performed subsequently, wherein an involved size of the bit blocks obtained after the rate matching applies a size corresponding m eREGs, and m is an integer larger than or equal to 1.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. HARQ-ACK coded bits not added with CRC bits are mapped at a corresponding fixed eCCE location.

A port selection and transmission manner is that the ePHICH is performed mapping by using an eREG as a unit, and applies a discrete mapping method. Port 107 and port 108 are selected alternatively as a DM-RS port of eREGs in dispersed in a plurality of RBs, and the used DM-RS occupies 12 REs. A random Beamforming method of a single-antenna port is applied on the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index}=(I_{PRB\_RA}+n_{DMRS}) \bmod N_{ePHICH}^{Total}+I_{PHICH}N_{ePHICH}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index}=(I_{PRB\_RA}+n_{DMRS}) \bmod M+I_{PHICH}M$$

$$n_{ePHICH}^{index}=(\lfloor I_{PRB\_RA}/M \rfloor+n_{DMRS}) \bmod N_{ePHICH}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eREG resource location corresponding to the determined ePHICH group to obtain the HARQ-ACK bit blocks, and then a HARQ-ACK bit location of the terminal in the ePHICH group is determined according to the foregoing formulae or the notification of the signalling of the upper layer.

If the terminal fails to detect an ePHICH at a predefined location, the terminal does not perform any processing and only waits for the base station to perform scheduling again at the moment, thereby avoiding interference caused by error retransmission.

Embodiment 12

In the embodiment of the disclosure, a time domain resource is predefined, joint coding is performed, and the size obtained after the joint coding is optional based on a bandwidth or system, wherein CRC of 8 bits is added, the size obtained by the rate matching is a size of an existing aggregation level, mapping is performed at a fixed resource location, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k sub-frame, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signalings includes a period indicating configuration of the predefined sub-frame, the used sub-frames, the used OFDM symbols, or the location of the initial OFDM symbol. These signallings are carried in MIB message of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB message of the PBCH.

Joint coding is performed on HARQ-ACK bits of a plurality of terminals, the size of bit blocks obtained after the joint coding may be configured by the base station side based on parameters including a carrier type and a system bandwidth or a service type and so on. When the system bandwidth is smaller than k RBs, or when the carrier type is an MTC carrier or the service type is an SPS service, bit blocks with relatively small sizes are configured, e.g. the size of the DCI format 1C, or a new size m is designed 5≤m≤10. When the system bandwidth is larger than k RBs, bit blocks with relatively large sizes are configured, e.g. the size of a DCI format 3A. CRC of 8 bits is added to the bit blocks obtained after the joint coding.

TBCC is performed on the bit blocks obtained after the joint coding, processing processes including rate matching and scrambling, and interleaving and so on are performed subsequently, wherein an involved size of the bit blocks obtained after the rate matching applies a size corresponding an aggregation level of 1, 2, 4, 8 or 16 eCCEs of an existing ePDCCH, or a redefined size corresponding to ½, or ¼ of an eCEE, or a size corresponding to m eREGs, and m is an integer larger than or equal to 1.

The bits blocks processed by processes including the joint coding, the rate matching, the scrambling and interleaving and so on are mapped to a physical PRB resource according to the following method: the base station side reserves a fixed eCCE resource, and configures a corresponding eCCE resource for each ePHICH group. Each ePHICH group corresponds to a fixed location and different ePHICH groups correspond to different locations. The processed bits blocks are mapped at a corresponding fixed eCCE location.

A port selection and transmission manner is that the ePHICH is performed mapping by using an eREG as a unit, and applies a discrete mapping method. Port 107 and port 108 are selected alternatively as a DM-RS port of eREGs dispersed in a plurality of RBs, and the used DM-RS occupies 12 REs. A random Beamforming method of a single-antenna port is applied on the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver, and may simultaneously define whether there is one or more ePHICH groups via a HARQ-ACK bit size configured by the ePHICH and a corresponding aggregation level.

When one ePHICH group is defined, a resource in a HARQ-ACK group of the terminal is determined by UL parameters $I_{PRB\_RA}$ and $n_{DMRS}$ jointly:

$$n_{ePHICH}^{index} = (I_{PRB\_RA} + n_{DMRS}) \bmod N_{ePHICH}^{Total} + I_{PHICH} N_{ePHICH}^{Total}.$$

When a plurality of ePHICH groups are defined, a resource of an HARQ-ACK group of the terminal and a resource in the group are obtained dynamically through scheduled UL parameters $I_{PRB\_RA}$ and $n_{DMRS}$ of the terminal:

$$n_{ePHICH}^{group\_index} = (I_{PRB\_RA} + n_{DMRS}) \bmod M + I_{PHICH} M$$

$$n_{ePHICH}^{index} = (\lfloor I_{PRB\_RA}/M \rfloor + n_{DMRS}) \bmod N_{ePHICH}^{Total}.$$

The resource of the HARQ-ACK group of the terminal and the resource in the group may be also determined by a signalling of an upper layer: an ePHICH group where the terminal locates and the locations of the HARQ-ACK bits in the group are notified by a signalling of an upper layer.

Demodulation is performed at a fixed eREG resource location corresponding to the determined ePHICH group to obtain the HARQ-ACK bit blocks, and then a HARQ-ACK bit location of the terminal in the ePHICH group is determined according to the foregoing formulae or the notification of the signalling of the upper layer.

If the terminal fails to detect an ePHICH at a predefined location, the terminal does not perform any processing and only waits for the base station to perform scheduling again at the moment, thereby avoiding interference caused by error retransmission. If CRC of an ePHICH decoded bit fails to pass verification, the terminal does not perform any processing at the moment and only waits for the base station to perform scheduling again.

Embodiment 13

In the embodiment of the disclosure, a time domain resource is predefined, joint coding is performed, and the size obtained after the joint coding is optional based on a bandwidth or system, wherein CRC of 16 bits is added, the size obtained by the rate matching is a size of an existing aggregation level, blind detection is performed, distributed transmission is performed and ports are selected alternatively.

A design method of an ePHICH based on joint coding of HARQ-ACK bits of a plurality of terminals is provided in the embodiment.

(1) Processing of a network side includes the following process.

The network side predefines a time domain resource of an ePHICH, and the predefined time domain resource includes that an occupied sub-frame and an initial OFDM symbol may be predefined, wherein the occupied sub-frame is predefined to be n+k, where n sub-frame is a sub-frame when a base station receives a PUSCH of a terminal and k is an integer smaller than or equal to 10; or it is predefined that some sub-frames belong to a set S, using n as a period; the initial OFDM symbol is predefined to be m symbol, and a value range of m is [0,7]; it is predefined that a time domain length is the first time slot, or the second time slot, or two time slots of the sub-frame; specific time domain OFDM symbols in the occupied sub-frame is predefined, wherein the specific time domain OFDM symbols may be continuous OFDM symbols, or specific discrete OFDM symbols.

The predefined information is notified to a terminal via signalings, and content of the signallings includes a period indicating configuration of the predefined sub-frame, the used sub-frames, the used OFDM symbols, or the location of the initial OFDM symbol. These signallings are carried in MIB message of a PBCH.

A predefined frequency domain resource includes N PRB pairs (FIG. 5) of two sidebands of a frequency domain, N PRB pairs (FIG. 6) mapped at equal intervals, N discrete PRB pairs (FIG. 7) on a frequency band of which a bandwidth is 1.4M and a center is a center frequency point, N fixed and successive PRB pairs (FIG. 8) of the central frequency point, and N PRB pairs (FIG. 9) of the first PRB numbers, wherein a value of N may be a fixed value, or N is an optional value based on a system bandwidth, a sub-frame type and a CP type.

The predefined information is notified to the terminal via the signallings, and when the content of the signallings indicates the initial locations and the number of PRBs for determining an ePHICH, the signallings indicate specific numbers of PRB pairs for discrete PRBs, and the signallings indicate the initial locations and the N value of PRB pairs for continuous PRBs. The signallings are carried in the MIB message of the PBCH.

Joint coding is performed on HARQ-ACK bits of a plurality of terminals, the size of bit blocks obtained after the joint coding may be configured by the base station side based on parameters including a carrier type and a system bandwidth or a service type and so on. When the system bandwidth is smaller than k RBs, or when the carrier type is an MTC carrier or the system bandwidth is an SPS service, bit blocks with relatively small sizes are configured, e.g. the size of the DCI format 1C, or a new size m is designed 5≤m≤10. When the system bandwidth is larger than k RBs, bit blocks with relatively large sizes are configured, e.g. the size of a DCI format 3A. CRC of 16 bits is added to the bit blocks obtained after the joint coding.

TBCC is performed on the bit blocks obtained after the joint coding, processing processes including rate matching and scrambling, and interleaving and so on are performed subsequently, wherein an involved size of the bit blocks obtained after the rate matching applies a size corresponding an aggregation level of 1, 2, 4, 8 or 16 eCCEs of an existing ePDCCH.

The bits blocks processed by processes including the joint coding, the rate matching, the scrambling and interleaving and so on are mapped to a physical PRB resource according to the following method: the base station side performs scrambling according to CRC generated when an HARQ-ACK bit is coded by an PHICH-RNTI, and performs mapping according to an aggregation level of 1, 2, 4, 8 or 16 eCCEs.

A port selection and transmission manner is that the ePHICH is performed mapping by using an eCCE as a unit, and applies a discrete mapping method. Port 107 and port 108 are selected alternatively as a DM-RS port of an eREG in a D-eCCE, and the used DM-RS occupies 12 REs. A random Beamforming method of a single-antenna port is applied on the ePHICH.

(2) Processing of a receiver includes the following process.

The receiver obtains the time domain resource corresponding to the ePHICH via related signalling information in an MIB, and then performs calculation according to a related equation to determine an ePHICH group corresponding to the receiver.

A resource of an HARQ-ACK group of the terminal and a resource in the group obtained dynamically through scheduled UL parameters $I_{PRB\_RA}$ and $n_{DMRS}$ of the terminal:

$$n_{ePHICH}^{group\_index}=(I_{PRB\_RA}+n_{DMRS}) \bmod M + I_{PHICH}M$$

$$n_{ePHICH}^{index}=(\lfloor I_{PRB\_RA}/M \rfloor + n_{DMRS}) \bmod N_{ePHICH}^{Total}.$$

The ePHICH group where the terminal locates may be obtained through the foregoing formulae. The terminal performs blind detection on the ePHICH by using a PHICH-RNTI corresponding to the terminal to detect an ePHICH group where HARQ-ACK of the terminal locates, and then determines a bit location where the HARQ-ACK of the terminal locates according to the foregoing formulae.

If the terminal fails to detect an ePHICH, or CRC of an ePHICH decoded bit fails to pass verification, the terminal does not perform any processing at the moment and only waits for the base station to perform scheduling again.

Relations between the states and signalling bit values in the embodiments may be replaced arbitrarily, and all description is included in the scope of the disclosure as long as the states are the same.

It may be seen from the foregoing description that the disclosure implements the following technical effect: HARQ-ACK information of a terminal may be transmitted reliably on a NCT, the reliability of transmission of UL data in a low cost terminal may be improved, while problems including a conflict of PHICH resource allocation and ICIC of a frequency domain in a small cell and so on are solved.

Obviously, those skilled in the art should understand that the modules or steps of the disclosure may be implemented by general-purpose computing devices and centralized in a single computing device or distributed over a network consisting of a plurality of computing devices. Optionally, they may be implemented by program codes executable by a computing device, so that they may be stored in a storage device and executed by the computing device, and in some cases, the steps as illustrated or described may be executed by a sequence different from those herein, or they made be implemented by respectively fabricating them into respective integrated circuit modules or by fabricating a plurality of modules or steps of them into a single integrated circuit module. By doing so, the disclosure is not limited to any specific combination of hardware and software.

The above are only preferred embodiments of the disclosure and should not be used for limiting the disclosure. For those skilled in the art, the disclosure may have various modifications and changes. Any modifications, equivalent replacements, improvements and the like within the spirit and principle of the disclosure shall fall within the scope of protection of the disclosure.

What is claimed is:

1. A method for sending Acknowledgement (ACK)/Negative Acknowledgement (NACK) information, characterized by comprising:
   dividing ACK/NACK information of a plurality of terminals into X groups according to a preset indication parameter, wherein X is a positive integer greater than or equal to 1,
   performing joint coding on ACK/NACK information corresponding to each group of the X groups respectively, to obtain X first bit blocks; and mapping the X first bit blocks to a predetermined ACK/NACK physical resource and sending the X first bit blocks;

wherein the preset indication parameter comprises at least one of the followings: a size of each of the X first bit blocks, the number X of the groups into which the ACK/NACK information of the plurality of terminals is to be divided, the number of bits of the ACK/NACK information corresponding to each group of the X groups, and location information corresponding to ACK/NACK information of each terminal of the plurality of terminals, or, the predetermined ACK/NACK physical resource comprises at least one of the followings: the predetermined ACK/NACK physical resource comprises one or more Resource Blocks (RBs); the predetermined ACK/NACK physical resource and an enhanced Physical Downlink Control Channel (ePDCCH) jointly occupy one or more the RBs; the predetermined ACK/NACK physical resource and a Physical Downlink Shared Channel (PDSCH) jointly occupy one or more the RBs.

2. The method according to claim 1, characterized in that a time domain resource of the predetermined ACK/NACK physical resource comprises one or more of the following forms: an occupied time domain length is predefined to be a first time slot and/or a second time slot of a sub-frame; a preset Orthogonal Frequency Division Multiplexing (OFDM) symbol in a predefined sub-frame to be occupied; the serial number of the occupied sub-frame is predefined to be n+k, where n is a serial number of a sub-frame on which a network side receives a Physical Uplink Shared Channel (PUSCH) of a terminal and k is an integer smaller than or equal to 10; a preset part of sub-frames in a predefined wireless frame, wherein the sub-frames of the preset part form a set S and S appears repeatedly with a period of m; an initial OFDM symbol p in a predefined sub-frame, and a value range of p is [0,9]; or, a frequency domain resource of the predetermined ACK/NACK physical resource comprises one or more of the following forms: N Physical RB (PRB) pairs at two sidebands of a frequency domain, N PRB pairs mapped at equal intervals, N discrete PRB pairs on a frequency band of which a bandwidth is 1.4M and a center is a center frequency point, N fixed and successive PRB pairs of the central frequency point, and N PRB pairs of the first PRB numbers, N PRB pairs indicated by a signalling, wherein N is a preset value, or a parameter for determining a value of N comprises at least one of the followings: a system bandwidth, a sub-frame type, a Cyclic Prefix (CP) type, a system mode, a distribution ratio of Uplink (UL) sub-frames to DownLink (DL) sub-frames of Time Division Duplex (TDD) and a configuration signalling.

3. The method according to claim 1, characterized in that the number of bits occupied by the ACK/NACK information corresponding to each group of the X groups is one of the followings: a size of a Downlink Control Information (DCI) format 3; a size of a DCI format 1C; a size determined according to indication information, wherein the indication information comprises at least one of the followings: a carrier type, a system bandwidth, a service type, an indication signalling, a sub-frame type, a system mode, a distribution ratio of UL sub-frames to DL sub-frames; or, the number of Resource Element (REs) contained in a physical resource corresponding to each first bit block of the X first bit blocks comprises at least one of the followings: a preset resource size in an ePDCCH which is a size corresponding to 1, 2, 4, 8 or 16 enhanced Control Channel Element (eCCEs); a size corresponding to ½, ¼, or ⅛ of an eCCE formed by available REs in a PRB of one ePDCCH; a size corresponding to m enhanced Resource Element Group (eREGs) wherein m is an integer larger than or equal to 1; a value of the number of the REs indicated by an upper layer signaling or configured directly.

4. The method according to claim 1, characterized in that mapping the X first bit blocks to the predetermined ACK/NACK physical resource and sending the X first bit blocks comprises: mapping the X first bit blocks to one predefined resource set in the predetermined ACK/NACK physical resource and sending the X first bit blocks, wherein a location of the one predefined resource set is fixed, and ACK/NACK information corresponding to different groups of the X groups corresponds to different locations in the resource set, or performing scrambling on the X first bit blocks according to a dedicated Radio Network Temporary Identifier (RNTI) used for receiving ACK/NACK information, selecting one resource set from a plurality of resource sets in the predetermined ACK/NACK physical resource to perform mapping and sending, wherein a rule for selecting the one resource set comprises: selecting the one resource set according to a preset resource size, or selecting the one resource set according to a resource size determined by at least one of the following parameters: a system bandwidth, a sub-frame type, a Cyclic Prefix (CP) type, and a distribution ratio of UL sub-frames to DL sub-frames; or, when an eCCE is used as a mapping unit, all or some eCCEs in the whole RB are taken to perform mapping, or a plurality of successive or discrete eCCEs are taken to perform mapping, or eCCEs selected at an interval according to a preset rule are taken to perform mapping; when an eREG is taken as a unit to perform mapping, some eREG units in one eCCE are taken to perform mapping, or some eREG units in a plurality of eCCEs mapped successively or discretely are taken to perform mapping.

5. The method according to claim 4, characterized in that mapping the X first bit blocks to the predetermined ACK/NACK physical resource and sending the X first bit blocks further comprises: selecting, in the predetermined ACK/NACK physical resource, a transmission manner of the X first bit blocks, wherein when a distributed mapping manner is applied, a Demodulation Reference Symbol (DM-RS) port of an eREG in an discrete eCCE is the same as a port of an ePDCCH, or is a predefined DM-RS port, or is a DM-RS port notified by a signalling of an upper layer, or is a preset dedicated DM-RS port of the ACK/NACK information; when a centralized mapping manner is applied, an applied antenna port is the same as a port of an ePDCCH, or is a predefined DM-RS port, or is a DM-RS port notified by a signalling of an upper layer, or is a preset dedicated DM-RS port of the ACK/NACK information, or is a port determined according to a predefined parameter, wherein the predefined parameter comprises at least one of the followings: an index of a current eCCE, a cell identifier, a terminal identifier, and a group index corresponding to the first bit blocks, wherein the transmission manner of the X first bit blocks comprises a predefined manner or a manner notified via a signalling; or, mapping the X first bit blocks to the predetermined ACK/NACK physical resource and sending the X first bit blocks further comprises: determining a group where ACK/NACK information of each terminal of the plurality of terminals locates, and a location of the ACK/NACK information of each terminal in the group, wherein a parameter for determining the group and the location in the group at least comprises one of the following parameters: the minimum or maximum PRB index $I_{PRB\_RA}$ of PRB of an UL resource allocated to each terminal, a DM-RS cyclic shift value $n_{DMRS}$ in a PUSCH allocated to each terminal, a size $N_{ePHICH}^{Total}$ of each first bit block of the X first bit blocks, an index value $k_p$ corresponding to a DM-RS port during performing mapping on the first bit blocks, an indication parameter $I_{PHICH}$, and the X value; or determining directly, through a signaling of an upper layer, a group where ACK/NACK information of each terminal of the plurality of terminals locates, and the location of the ACK/NACK information of each terminal in the group.

6. The method according to claim 1, characterized in that the method further comprises:

sending parameter information of the predetermined ACK/NACK physical resource and/or the preset indication parameter to the plurality of terminals, or sending to the plurality of terminals the group where the ACK/NACK information of each terminal of the plurality of terminals locates, and the location of the ACK/NACK information of each terminal in the group.

7. A method for receiving Acknowledgement (ACK)/Negative Acknowledgement (NACK), information, characterized by comprising:

receiving and demodulating first bit blocks on a predetermined ACK/NACK physical resource, wherein the first bit blocks are X first bit blocks obtained by performing, after dividing ACK/NACK information of a plurality of terminals into X groups, joint coding on ACK/NACK information corresponding to each group of the X groups respectively, wherein X is a positive integer greater than or equal to 1;

acquiring ACK/NACK information of the plurality of terminals from the first bit blocks according to a receiving and demodulating result;

wherein ACK/NACK information of a plurality of terminals are divided into X groups according to a preset indication parameter; the preset indication parameter comprises at least one of the followings: a size of each of the X first bit blocks, the number X of the groups into which the ACK/NACK information of the plurality of terminals is to be divided, the number of bits of the ACK/NACK information corresponding to each group of the X groups, and location information corresponding to ACK/NACK information of each terminal of the plurality of terminals, or, the predetermined ACK/NACK physical resource comprises at least one of the followings: the predetermined ACK/NACK physical resource comprises one or more Resource Blocks (RBs); the predetermined ACK/NACK physical resource and an enhanced Physical Downlink Control Channel (ePDCCH) jointly occupy one or more the RBs; the predetermined ACK/NACK physical resource and a Physical Downlink Shared Channel (PDSCH) jointly occupy one or more the RBs.

8. The method according to claim 7, characterized in that receiving and demodulating the first bit blocks on the predetermined ACK/NACK physical resource comprises: receiving and demodulating the first bit blocks on the predetermined ACK/NACK physical resource according to signalling information sent by a network side and/or a configuration parameter of the plurality of terminals, wherein the signalling information and/or information carried in the configuration parameter comprise at least one of the followings: the number X of the groups into which the ACK/NACK information of the plurality of terminals is to be divided, the number of bits of ACK/NACK information included in each group of the X groups, sizes of the first bit blocks, a resource mapping manner of the first bit blocks, a location of the predetermined ACK/NACK physical resource, a transmission manner of the predetermined ACK/NACK physical resource, a Demodulation Reference Symbol (DM-RS) port used for transmitting the first bit blocks, whether Cyclic Redundancy Check (CRC) is added to the first bit blocks, and the number of bits of the added CRC, a system bandwidth, a sub-frame type, a Cyclic Prefix (CP) type, and a distribution ratio of Uplink (UL) sub-frames to Down-Link (DL) sub-frames; or, receiving and demodulating the first bit blocks on the predetermined ACK/NACK physical resource comprises: receiving and demodulating the first bit blocks in one predefined resource set in the predetermined ACK/NACK physical resource, wherein a location of the one predefined resource set is fixed, and locations of different first bit blocks in the one predefined resource set are different, or selecting a resource set from a plurality of resource sets in the predetermined ACK/NACK physical resource according to a dedicated Radio Network Temporary Identifier (RNTI) used for receiving ACK/NACK information, and receiving and demodulating the first bit blocks, wherein a rule for selecting the one resource set comprises: selecting the one resource set according to a preset resource size, or selecting the one resource set according to a resource size determined by at least one of the following parameters: a system bandwidth, a sub-frame type, a Cyclic Prefix (CP) type, and a distribution ratio of UL sub-frames to DL sub-frames.

9. The method according to claim 8, characterized in that the resource mapping manner of the first bit blocks in the one resource set comprises: when an enhanced Control Channel Element, eCCE, is used as a mapping unit, all or some eCCEs in the whole Resource block, RB, are taken to perform mapping, or a plurality of successive or discrete eCCEs are taken to perform mapping, or eCCEs selected at an interval according to a preset rule are taken to perform mapping; when an enhanced Resource Element Group, eREG, is taken as a unit to perform mapping, some eREG units in one eCCE are taken to perform mapping, or some eREG units in a plurality of eCCEs mapped successively or discretely are taken to perform mapping; or, receiving and demodulating the first bit blocks on the predetermined ACK/NACK physical resource comprises: determining a transmission manner of the first bit blocks in the physical resource, when a distributed mapping manner is applied, a Demodulation Reference Symbol (DM-RS) port of an eREG in discrete eCCEs is the same as a port of an enhanced Physical Downlink Control Channel (ePDCCH) or is a predefined DM-RS port, or is a DM-RS port notified by a signalling of an upper layer, or is a preset dedicated DM-RS port of the ACK/NACK information; when a centralized mapping manner is applied, the same DM-RS antenna port is applied to all eREGs in Physical Resource Block, PRB, pairs occupied by the first bit blocks, the applied antenna port may be the same as a port of an ePDCCH, or is a predefined DM-RS port, or is a DM-RS port notified by a signalling of an upper layer, or is a preset dedicated DM-RS port of the ACK/NACK information, or is a port determined according to a predefined parameter, wherein the predefined parameter comprises at least one of the followings: an index of a current eCCE, a cell identifier, a terminal identifier, and a group index corresponding to the first bit blocks.

10. The method according to claim 8, characterized in that receiving and demodulating the first bit blocks in the one predefined resource set in the predetermined ACK/NACK physical resource comprises: determining time domain resources corresponding to the first bit blocks according to signaling information; determining the first bit blocks to which the plurality of terminals belong; and determining locations of the ACK/NACK information of the plurality of terminals in the first bit blocks to which the plurality of terminals belong; or,
selecting one resource set from the plurality of resource sets in the predetermined ACK/NACK physical resource according to the dedicated RNTI used for receiving the ACK/NACK information, and receiving and demodulating the first bit blocks comprises: performing, by using the dedicated RNTI used for receiving the ACK/NACK information, a detection in the selected resource set according to a preset resource size or a preset bit block size.

11. The method according to claim 7, characterized in that obtaining the ACK/NACK information of the plurality of terminals in the first bit blocks comprises:
when there is one first bit block, a parameter for determining locations of the ACK/NACK information of the plurality of terminals in the first bit block at least comprises one of the following parameters: the minimum or maximum PRB index $I_{PRB\_RA}$ of PRB of UL resources allocated to the plurality of terminals, a DM-RS cyclic shift value $n_{DMRS}$ in Physical UL Shared Channels (PUSCH) allocated to the plurality of terminals, a size $N_{ePHICH}^{Total}$ of a configured and jointly coded bit block, an index value $k_p$ corresponding to a DM-RS port during performing mapping on the first bit block, and an indication parameter $I_{PHICH}$; or determining directly, through a signaling of an upper layer, the locations of the ACK/NACK information of the plurality of terminals in the first bit block;
when there are a plurality of the first bit blocks, a parameter for determining the first bit blocks to which the ACK/NACK information of the plurality of terminals belong, and the locations of the ACK/NACK information of the plurality of terminals in the first bit blocks to which the plurality of terminals belong at least comprises one of the following parameters: the minimum or maximum PRB index $I_{PRB\_RA}$ of PRB of UL resources corresponding to the plurality of terminals, DM-RS cyclic shift values $n_{DMRS}$ in PUSCHs corresponding to the plurality of terminals, a size $N_{ePHICH}^{Total}$ of a configured and jointly coded bit blocks, an index value $k_p$ corresponding to a DM-RS port during performing mapping on the ACK/NACK bit blocks, an indication parameter $I_{PHICH}$, and the X value; or determining directly, through a signaling of an upper layer, the first bit blocks to which the plurality of terminals belong, and the locations of the ACK/NACK information of the plurality of terminals in the first bit blocks to which the plurality of terminals belong.

12. The method according to claim 7, characterized in that when ACK/NACK bit blocks of the plurality of terminals are not detected at locations of eCCEs or eREGs or in PRBs, or CRC of detected ACK/NACK bit blocks fails to pass verification, the plurality of terminals wait for a network side to perform scheduling again; or,
the number of Resource Element (REs) contained in a physical resource corresponding to the each first bit block of the X first bit blocks comprises at least one of the followings: a preset resource size in an ePDCCH is a size corresponding to 1, 2, 4, 8 or 16 eCCEs; a size corresponding to ½, ¼, or ⅛ of an eCCE formed by available REs in a PRB of one ePDCCH; a size corresponding to m eREGs, wherein m is an integer larger than or equal to 1; a value of the number of the REs indicated by an upper layer signaling or configured directly.

13. A base station, characterized by comprising: a hardware processor, configured to perform programming components stored in a memory, wherein the base station comprise:
a grouping component, connected with a coding component and configured to divide Acknowledgement (ACK)/Negative Acknowledgement (NACK) information of a plurality of terminals into X groups according to a preset indication parameter, wherein X is a positive integer greater than or equal to 1;
the coding component, connected with a sending component and configured to perform joint coding on ACK/NACK information corresponding to each group of the X groups respectively, to obtain X first bit blocks;
the sending component, connected with the coding component and configured to map the X first bit blocks to a predetermined ACK/NACK physical resource and send the X first bit blocks;
wherein the preset indication parameter comprises at least one of the followings: a size of each of the X first bit blocks, the number X of the groups into which the ACK/NACK information of the plurality of terminals is to be divided, the number of bits of the ACK/NACK information corresponding to each group of the X groups, and location information corresponding to ACK/NACK information of each terminal of the plurality of terminals, or,
the predetermined ACK/NACK physical resource comprises at least one of the followings: the predetermined ACK/NACK physical resource comprises one or more Resource Blocks (RBs); the predetermined ACK/NACK physical resource and an enhanced Physical Downlink Control Channel (ePDCCH) jointly occupy one or more the RBs; the predetermined ACK/NACK physical resource and a Physical Downlink Shared Channel (PDSCH) jointly occupy one or more the RBs.

14. The base station according to claim 13, characterized in that
the sending component comprises: a first sending element, configured to map the X first bit blocks to one predefined resource set in the predetermined ACK/NACK physical resource and send the X first bit blocks, wherein a location of the one predefined resource set is fixed, ACK/NACK information corresponding to different groups of the X groups corresponds to different locations in the resource set, or a second sending element, configured to perform scrambling on the X first bit blocks according to a dedicated Radio Network Temporary Identifier (RNTI) used for receiving ACK/NACK information, select one resource set from a plurality of resource sets in the predetermined ACK/NACK physical resource to perform mapping and sending, wherein a rule for selecting the one resource set comprises: selecting the one resource set according to a preset resource size, or selecting the one resource set according to a resource size determined by at least one of the following parameters: a system bandwidth, a sub-frame type, a Cyclic Prefix (CP) type, and a distribution ratio of Uplink (UL) sub-frames to Downlink (DL) sub-frames; or, the sending component further comprises: a first mapping element, configured to, when an enhanced Control Channel Element, eCCE, is used as a mapping unit, perform mapping on all or some eCCEs in the whole Resource block, RB, or perform mapping on a plurality of successive or discrete eCCEs, or eCCEs selected at an interval according to a preset rule are taken to perform mapping; a second mapping element, configured to, when an enhanced Resource Element Group, eREG, is taken as a unit to perform mapping, take some eREG units in one eCCE to perform mapping, or take some eREG units in a plurality of eCCEs mapped successively or discretely to perform mapping.

15. The base station according to claim 14, characterized in that the sending component further comprises: a selecting element, configured to select, in the predetermined ACK/NACK physical resource, a transmission manner of the X first bit blocks, wherein when a distributed mapping manner is applied, a Demodulation Reference Symbol (DM-RS) port of an eREG in an discrete eCCE is the same as a port of an enhanced Physical Downlink Control Channel (ePDCCH) or is a predefined DM-RS port, or is a DM-RS port notified by a signalling of an upper layer, or is a preset dedicated DM-RS port of the ACK/NACK information; when a centralized mapping manner is applied, an applied antenna port is the same as a port of an ePDCCH, or is a predefined DM-RS port, or is a DM-RS port notified by a signalling of an upper layer, or is a preset dedicated DM-RS port of the ACK/NACK information, or is a port determined according to a predefined parameter, wherein the predefined parameter comprises at least one of the followings: an index of a current eCCE, a cell identifier, a terminal identifier, and a group index corresponding to the first bit blocks, wherein the transmission manner of the X first bit blocks comprises a predefined manner or a manner notified via a signalling; or, the sending component further comprises: a determining element, configured to determine a group where ACK/NACK information of each terminal of the plurality of terminals locates, and location of the ACK/NACK information of each terminal in the group, wherein a parameter for determining the group and the location in the group at least comprises one of the following parameters: the minimum or maximum PRB index $I_{PRB\_RA}$ of PRB of an UL resource allocated to each terminal, a DM-RS cyclic shift value $n_{DMRS}$ in a Physical UL Shared Channel (PUSCH) allocated to each terminal, a size $N_{ePHICH}^{Total}$ of each first bit block of the X first bit blocks, an index value $k_p$ corresponding to a DM-RS port during performing mapping on the first bit blocks, an indication parameter $I_{PHICH}$, and the X value; or determine directly, through a signaling of an upper layer, a group where ACK/NACK information of each terminal of the plurality of terminals locates, and the location of the ACK/NACK information of each terminal in the group.

16. The base station according to claim 13, characterized in that the sending component is further configured to send parameter information of the predetermined ACK/NACK physical resource and/or the preset indication parameter to the plurality of terminals, or send to the plurality of terminals the group where the ACK/NACK information of each terminal of the plurality of terminals locates, and the location of the ACK/NACK information of each terminal in the group.

17. A terminal, characterized by comprising: a hardware processor, configured to perform programming components stored in a memory, wherein the base station comprise:

a demodulating component, configured to receive and demodulate first bit blocks on a predefined Acknowledgement (ACK)/Negative Acknowledgement (NACK) physical resource, wherein the first bit blocks are X first bit blocks obtained by performing, after dividing ACK/NACK information of a plurality of terminals into X groups, joint coding on ACK/NACK information corresponding to each group of the X groups respectively, wherein X is a positive integer greater than or equal to 1;

the acquiring component, connected with the demodulating component and configured to acquire the ACK/NACK information of the terminals from the first bit blocks according to a receiving and demodulating result;

wherein ACK/NACK information of a plurality of terminals are divided into X groups according to a preset indication parameter; the preset indication parameter comprises at least one of the followings: a size of each of the X first bit blocks, the number X of the groups into which the ACK/NACK information of the plurality of terminals is to be divided, the number of bits of the ACK/NACK information corresponding to each group of the X groups, and location information corresponding to ACK/NACK information of each terminal of the plurality of terminals, or, the predetermined ACK/NACK physical resource comprises at least one of the followings: the predetermined ACK/NACK physical resource comprises one or more Resource Blocks (RBs); the predetermined ACK/NACK physical resource and an enhanced Physical Downlink Control Channel (ePDCCH) jointly occupy one or more the RBs; the predetermined ACK/NACK physical resource and a Physical Downlink Shared Channel (PDSCH) jointly occupy one or more the RBs.

18. The terminal according to claim 17, characterized in that the demodulating component is configured to receive and demodulate the first bit blocks on the predetermined ACK/NACK physical resource according to signalling information sent by a network side and/or a configuration parameter of the terminals, wherein the signalling information and/or information carried in the configuration parameter comprise at least one of the followings: number X of the groups into which the ACK/NACK information of the plurality of terminals is to be divided, the number of bits of ACK/NACK information included in each group of the X groups, sizes of the first bit blocks, a resource mapping manner of the first bit blocks, a location of the predetermined ACK/NACK physical resource, a transmission manner of the predetermined ACK/NACK physical resource, a Demodulation Reference Symbol (DM-RS) port used for transmitting the first bit blocks, whether Cyclic Redundancy Check (CRC) is added to the first bit blocks, and the number of bits of the added CRC, a system bandwidth, a sub-frame type, a Cyclic Prefix (CP) type, and a distribution ratio of Uplink (UL) sub-frames to Downlink (DL) sub-frames; or, the demodulating component comprises: a first demodulating element, configured to receive and demodulate the first bit blocks in one predefined resource set in the predetermined ACK/NACK physical resource, wherein a location of the one predefined resource set is fixed, and locations of different first bit blocks in the one predefined resource set are different, or a second demodulating element, configured to select a resource set from a plurality of resource sets in the predetermined ACK/NACK physical resource according to a dedicated Radio Network Temporary Identifier (RNTI) used for receiving ACK/NACK information, and receive and demodulate the first bit blocks, wherein a rule for selecting the one resource set comprises: selecting the one resource set according to a preset resource size, or selecting the one resource set according to a resource size determined by at least one of the following parameters: a system bandwidth, a sub-frame type, a Cyclic Prefix (CP) type, and a distribution ratio of UL sub-frames to DL sub-frames.

19. The terminal according to claim 18, characterized in that the demodulating component further comprises: a first selecting element, configured to, when an enhanced Control Channel Element, eCCE, is used as a mapping unit, perform mapping on all or some eCCEs in the whole Resource block, RB, or perform mapping on a plurality of successive or discrete eCCEs, or select eCCEs at an interval according to a preset rule to perform mapping; a second selecting element, configured to, when an enhanced Resource Element Group, eREG, is taken as a unit to perform mapping, take some eREG units in one eCCE to perform mapping, or take some eREG units in a plurality of eCCEs mapped successively or discretely to perform mapping; or, the demodulating component further comprises: a determining element, configured to determine a transmission manner of the first bit blocks in the physical resource, wherein when a distributed mapping manner is applied, a Demodulation Reference Symbol (DM-RS) port of an eREG in discrete eCCEs is the same as a port of an enhanced Physical Downlink Control Channel (ePDCCH) or is a predefined DM-RS port, or is a DM-RS port notified by a signalling of an upper layer, or is a preset dedicated DM-RS port of the ACK/NACK information; when a centralized mapping manner is applied, the same DM-RS antenna port is applied to all eREGs in Physical Resource Block, PRB, pairs occupied by the first bit blocks, the applied antenna port may be the same as a port of an ePDCCH, or is a predefined DM-RS port, or is a DM-RS port notified by a signalling of an upper layer, or is a predefined dedicated DM-RS port of the ACK/NACK information, or is a port determined according to a predefined parameter, wherein the predefined parameter comprises at least one of the followings: an index of a current eCCE, a cell identifier, a terminal identifier, and a group index corresponding to the first bit blocks.

20. The terminal according to claim 18, characterized in that the first demodulating element comprises: a first determining sub-element, configured to determine time domain resources corresponding to the first bit blocks according to signaling information; a second determining sub-element, configured to determine the first bit blocks to which the plurality of terminals belong; and a third determining sub-element, configured to determine locations of the ACK/NACK information of the plurality of terminals in the first bit blocks to which the plurality of terminals belong; or, the second demodulating element is further configured to perform, by using the dedicated RNTI used for receiving the ACK/NACK information, a detection in the selected resource set according to a preset resource size or a preset bit block size.

* * * * *